US009965735B2

(12) United States Patent
Ramesh Babu

(10) Patent No.: US 9,965,735 B2
(45) Date of Patent: May 8, 2018

(54) SYSTEM AND METHOD FOR IT SOURCING MANAGEMENT AND GOVERNANCE COVERING MULTI GEOGRAPHY, MULTI SOURCING AND MULTI VENDOR ENVIRONMENTS

(71) Applicant: ENERGICA ADVISORY SERVICES PVT. LTD., Chennai (IN)

(72) Inventor: Somasundaram Ramesh Babu, Chennai (IN)

(73) Assignee: ENERGICA ADVISORY SERVICES PVT. LTD., Chennai (IN)

( * ) Notice: Subject to any disclaimer, the term of this patent is extended or adjusted under 35 U.S.C. 154(b) by 882 days.

(21) Appl. No.: 14/148,708

(22) Filed: Jan. 6, 2014

(65) Prior Publication Data
US 2015/0193709 A1 Jul. 9, 2015

(51) Int. Cl.
*G06Q 10/06* (2012.01)
*G06Q 30/00* (2012.01)

(52) U.S. Cl.
CPC ..... *G06Q 10/0637* (2013.01); *G06Q 10/0639* (2013.01); *G06Q 30/00* (2013.01)

(58) Field of Classification Search
CPC ......... G06Q 10/00; G06Q 40/00; G06F 17/60
USPC ............................... 705/7.11–7.28
See application file for complete search history.

(56) References Cited

U.S. PATENT DOCUMENTS

| | | | | |
|---|---|---|---|---|
| 7,395,193 B1* | 7/2008 | Yelich | ..... | G06Q 30/02 703/6 |
| 2004/0039650 A1* | 2/2004 | Lentz | ..... | G06Q 10/087 705/80 |
| 2013/0246217 A1* | 9/2013 | Denton | ..... | G06Q 30/0206 705/26.7 |
| 2013/0246237 A1* | 9/2013 | Dyess | ..... | G06Q 30/0206 705/35 |
| 2014/0316940 A1* | 10/2014 | Kirchenbauer | ..... | G06Q 30/0609 705/26.35 |
| 2015/0019361 A1* | 1/2015 | Denton | ..... | G06Q 30/0605 705/26.2 |

* cited by examiner

*Primary Examiner* — Romain Jeanty
(74) *Attorney, Agent, or Firm* — Symbus Law Group, LLC; Clifford D. Hyra

(57) ABSTRACT

The present invention relates to the field of IT Sourcing Management and more specifically to the IT sourcing management and governance (SMG) covering multi geography, multi sourcing and multi vendor environments at an enterprise level. The enterprise governance solution with core sourcing management functional components includes a contract compliance management module, a IT spend visibility management and reporting module, a value driver management and reporting module, a contract compliance audit management module, a contract evaluation analysis module, a performance management module, with underlying governance processes such as organization change management, stake holder relationship management, governance, compliance and risk management, performance management, service delivery management, service quality management, communication management and reporting. The SMG solution enhances and optimizes relationship between the customer and the vendor organizations by utilizing the core modules regardless of the scope, objectives, contracts, IT sourcing programs, vendors, service delivery locations and region, country and business units.

29 Claims, 17 Drawing Sheets

SYSTEM AND METHOD FOR IT SOURCING MANAGEMENT AND GOVERNANCE COVERING MULTI GEOGRAPHY, MULTI SOURCING AND MULTI VENDOR ENVIRONMENTS

CROSS REFERENCE TO RELATED APPLICATIONS

Not Applicable.

FIELD OF THE INVENTION

The present invention relates to the field of IT Sourcing Management and more specifically to the IT sourcing management and governance for optimizing customer-vendor relationships. The present invention particularly relates to an integrated enterprise system and method for outsourcing management and governance for multi geography, multi sourcing and multi vendor environments between a customer and vendor organization(s) throughout the sourcing lifecycle in an effective manner.

BACKGROUND OF THE INVENTION

Technology enablement in IT sourcing governance is inevitable in today's outsourcing landscape considering the complex deal size, multi geography, multi sourcing and multi vendor environments. IT sourcing governance is critical to managing complex outsourcing arrangements, different geographies, different business units and multiple providers. Full-fledged sourcing management governance suite solutions are being offered from both IT service provider and third party software vendors. Governance solutions or products are built either focused on customer organization of outsourcing (buyer) or service provider organizations. However the tools built for service provider organizations focused either on service delivery management and governance or program management and governance with respect to vendor relationship management. The outsourcing and off shoring market continues to grow, with the addition of new technologies, services, geographies, new delivery models, as well as an increasing focus from regulators. Though large numbers of customer organizations are increasingly aware of and understand the importance of sourcing management and governance to realizing cost savings from outsourcing, mitigating the applicable risks and minimizing the value leakages. However sourcing management and governance process maturity and practices have not improved to a greater extent considering the complexity of sourcing landscape. There is significant and ample room for improvising the IT sourcing management and governance, not only in terms of investment in governance tools and resources, but also in managing the vendor relationships.

Governance tools available from external suppliers and software product vendors typically gravitate towards either performance management or program management or service delivery management or contract management or financial management arena. Componentized solutions are developed to meet the specific functional aspects like Contract Management System (CMS), Service Level Agreement (SLA) management (Help Desk, SLA tracking and reporting), governance (operational, service delivery management, program management) etc. Certain governance tools are predominantly developed exclusively for specific market segment or geography or exclusive IT service segments like BPO or shared services. These governance tools work well, but the primary disadvantage of such governance tools are clustered around managing functions closely associated with performance or SLA or problem management (Help Desk Service Management) or contract management, or spend analytics arena and are not capable to proactively identify and mitigate risk and bring value realization throughout the sourcing lifecycle. In addition, such governance tools do not provide entire spectrum of governance functionalities with respect to IT sourcing management value chain.

There are inappropriate alignment issues emerging between demand and supply organizations (client and service provider) in today are IT outsourcing considering the multi geography, multi vendor, multi sourcing environments. Some of the service provider solutions or solution frameworks cannot be leveraged outside their client relationship boundaries in a multisourcing environment. All service providers either have their own governance software tools, based on both custom or home-grown and commercial applications to manage the client relationships. While service provider tools play an important role in supporting outsourcing governance, typically client organizations will need to have their own tools, particularly if they are managing multiple outsourcing efforts (region, country, business units, IT services) employing multiple vendors. The client organizations typically use their own set of tools or products for financial management, procurement/sourcing, contract management and SLA management etc. Usage of these tools is widely varying from client to client. Even if some of the governance tools claimed to have specific governance functionalities, it would be difficult to implement and replace the existing core functional systems in financial management, procurement management, contract management, program management and service delivery management aspects cut across operational, tactical and strategic aspects. No single governance tool or platform comprehensively covers either the core functionalities or the entire bandwidth of functions within IT sourcing management and governance value chain or cut across different aspects of IT services.

There are some product vendors in the sourcing management & governance market place providing software with functionality that supports different pieces of an outsourcing governance value chain such as service delivery management and governance or program management and governance etc. For instance, one of the existing vendor solution frameworks is being used for program management and governance to manage the client's relationship regardless of the type of IT services or IT sourcing initiatives and client's business regions. However, this solution framework cannot be leveraged from the client organization as it involves multi sourcing initiatives and therefore the underlying solution framework, methodology and the process cannot be used outside the service provider boundary lines. Additionally, the solution framework does not have the capability of managing, monitoring and reporting of value management, contract compliance audit, contract evaluation analysis and customer satisfaction management on sourcing governance.

Another existing solution framework provides a system for providing enterprise level platform that enables collaborative business service delivery and governance through access to underlying infrastructure for connected customer-vendor systems. This solution mainly brings together various point solutions with intent of providing a single window that enables access to the underlying infrastructure for a connected customer-vendor IT operations. The system also focuses on supplier standpoint revolving around service delivery management and governance aspects. The downside to this solution is that the system does not disclose functional aspects of contract governance or contract obligation management. Further, the system does not provide contract compliance audit, contract evaluation analysis, customer satisfaction management on sourcing governance, IT spend visibility management reporting to enable financial control, compliance, governance with contractual commitments and other internal and external requirements.

There are several other point solutions developed exclusively from certain functional aspects rather than from IT sourcing governance aspects. For example, evaluating the supply base risk; there is a componentized solution which evaluates supplier risks and issues on a continual manner which is essential for today's sourcing management and governance stand point. There is a wider functional gap or differences between enterprise GRC solutions and ITSM focused GRC solution in today's market place. This function would generally be monitored as a part of the client's Enterprise Risk Management (ERM) solution rather than from specific aspects of sourcing governance. Further, the system does not monitor, manage, track and report the other aspects of sourcing governance between the customer and the vendors.

Some of the below mentioned products known to us which deal in addressing the some aspects of sourcing governance are as mentioned below.

EquaSiis's product "EquaSiis Enterprise" available at: http://www.equasiis.com/software-plus-intelligence/equasiis-enterprise describes a collaborative solution which is designed specifically for teams that govern critical business services through outsourced or shared services delivery models. It also automates the more routine transactional components of governance while providing a rich suite of analysis and decision-support tools.

Enlighta's product "Multi-vendor governance tool" available at: http://www.enlighta.com/products/enlighta-govern-for-multi-vendor-govemance/overview.html describes about a platform provides the comprehensive support for the multi-vendor governance for globally sourced (i.e. internal, captive or outsourced) services.

However, there exists a need to have a integrated system that not only simplifies the adoption and implementation of enhanced governance service management processes but also to provide entire spectrum of governance functionalities with respect to IT sourcing management value chain. The collaborative capability of the system under effective governance is expected to enrich stakeholders' performance across both client and vendor organizations resulting in efficient and effective governance, expected business outcomes, enhance the supplier relationships, program management office, minimizing and mitigating the risk and value leakage proactively.

Hence, it can be seen that there is a need for an integrated, effective tool for IT sourcing management and governance arena that would bring a balanced view of governance, enhancement and optimization of customer-vendor relationship through-out the contract or sourcing lifecycle. The governance solution of the present invention is primarily built from the customer perspectives considering multi sourcing, multi vendor and multi geography environments as the number of service provider or IT services increases, the complexity of managing the both the vendors and the client business units is very critical. This requires a consistent governance process mechanism across the sourcing management value chain. The system would include a sourcing management governor for managing, monitoring, tracking and reporting effective governance between a customer organization and vendor organizations throughout the sourcing lifecycle. This system would enable the customer organization to build governance capabilities in terms of governance process improvements and optimizations cut across various key process areas including contract management, financial management, relationship management, performance management, value management and risk and compliance management. Further, the system would provide effective decision management and reporting capabilities enabling governance of the sourcing relationships, managing and mitigating effective risk management. Moreover, the system would improve the overall performance level of the outsourcing governance process and the sourcing management arena cut across procurement, sourcing and vendor management, financial management, audit, legal and IT departments regardless of the geography, country and business unit they operate upon. In addition, this system would provide client organization improvised and effective governance capabilities over a period of time, to realize the expected cost savings, mitigating the applicable risks, minimizing the value leakages from the sourcing initiatives and effective vendor relationship management throughout the sourcing life cycle.

OBJECTS OF THE INVENTION

The main objective of the present invention is to provide a system and method for providing enterprise level governance solution for "IT Sourcing Management and Governance" covering multi geography (region, country, and business units), multi sourcing and multi vendor environments at an enterprise level. The present application addresses the following or specific problem areas of sourcing management and governance associated with multi geography, multisourcing, multi vendor environments.

A first objective of the present invention is to provide an effective, efficient governance software tool around IT Sourcing Management and Governance arena with respect to various IT services, service delivery model, deal size, multi geography, multi sourcing, multi vendor environment.

A second objective of the present invention is to provide a comprehensive SVM process and a growing demand to meet current sourcing management and governance needs.

A third objective of the present invention is to provide a governance tool to proactively identify and mitigate risk and bring value realization as expected throughout the contract/sourcing lifecycle.

A fourth objective of the present invention is to provide a common and consistent governance process across different region, country, business units and service providers across multi sourcing landscape.

A fifth objective of the present invention is to provide a strategic advantage for both client and vendor organization to bring a balanced view and a mechanism for effective governance, enhancing and optimizing the client supplier relationship through-out the contract or sourcing lifecycle.

A sixth objective of the present invention is to provide an enterprise platform that seamlessly brings together various point solutions, with intent of providing a unified view of governance that enables access to the underlying IT sourcing initiatives and programs for the extended enterprises (customer-vendor IT operations).

A seventh objective of the present invention is to provide a support to decision making and an enterprise view of supplier relationships, contract compliance, vendor performance, effective vendor governance, financial and commercial management and outsourcing strategy (CCM, SMR, CSAT) at the strategic level.

A eighth objective of the present invention is to provide a management oversight of external suppliers, the retained internal organizations and operational decision making support through advanced control and governance mechanisms through value management and reporting, service delivery management, contract evaluation analysis. e.g., analysis of the improvement opportunities, service delivery management (CCM, SMR, VMR, CEA) at the tactical level.

Another objective of the present invention is to provide sourcing value management (SVM) processes, such as SVM governance including compliance and risks (vendor contract compliance audits), issue escalation, conflict resolution obligation management, OLA, governance reporting, IT spend visibility management and reporting, change and communications management and continual improvements. They also provide transparency through the service area view of performance, log of contract change & service provision, issue dispute resolutions, value leakages and service quality management aspects (CCM, VCCA, SMR) at the operational level.

Yet another objective of the present invention is to manage multiple outsourcing efforts employing multiple service providers cut across different regions.

Several other objectives and advantages of the present invention are described in the following description with the help of exemplary embodiments.

SUMMARY OF THE INVENTION

To minimize the limitations found in the prior art, and to minimize other limitations that will be apparent upon the reading of the specifications, the preferred embodiment of the present invention provides an integrated governance solution framework comprising a sourcing management governor for managing, monitoring, tracking and reporting effective governance between the customer and the vendor organizations in a multi-sourced environment throughout the sourcing or contract lifecycle.

In accordance with one embodiment of the present invention, the integrated governance solution framework includes one or more participants such as a customer organization, vendor organizations, a procurement (sourcing) organization (CPO), a vendor management organization (SVM|VMO), a contract management organization (CMO), financial management, audit, legal, IT, a program management office, and a service delivery management organization.

The present invention automates routine governance monitoring, reporting activities, improve the accuracy of information used in performing governance activities reviews, effective decision management, raise the overall performance level of the outsourcing governance process and the sourcing management governance team cut across Procurement, Sourcing and Vendor Management, Financial Management, Contract Management, Audit, Legal, Business and IT departments regardless of the geography, country, business unit they operate upon.

The sourcing management governor (SMG) comprises a contract compliance management module, a financial/commercial management module, a performance management/customer satisfaction management module, a vendor contract compliance audit module, a contract evaluation analysis module, a performance management module, a service delivery management module and a sourcing governance management module.

The contract compliance management module is configured to manage and track a plurality of contracts and obligation compliance in an automated mode. Contract compliance management ensures that contractual obligations, milestones, deliverables are being met and the value realizations are achieved as expected throughout the contract lifecycle between the vendor and the customer organization, proactively identifying the appropriate issues and risks. Contract compliance management monitor and manage the changes in the plurality of contracts and contractual obligations with respect to changing business needs and establish an obligation traceability matrix including changes in the plurality of contractual obligations and generate an obligation management compliance report with a feedback loop action plan. Obligation traceability is established to trace and monitor the policies, processes, procedures, contractual clauses, and stakeholders who are involved and accountable for the delivery of obligations and compliance as a part of sourcing management &governance.

The financial/commercial management/spend visibility management and reporting module is configured to capture, manage and monitor the client's procurement and spend data (PO, invoice) with respect to various IT sourcing Initiatives, programs, provide a spend visibility analysis between an estimated budget data and the spend data. This module generates spend visibility and compliance analysis reports, evaluates customer satisfaction, spend compliance on a month on month basis with respect to various business region, country, business unit, suppliers, category of spend, identifying the spend leakage areas and cost savings opportunities to initiate cost savings programs (cost reduction and cost optimization) to yield the expected benefits from the underlying IT sourcing initiatives.

The performance management module is configured to evaluate vendor performance cut across a plurality of key stakeholders from the client organization in sourcing management and governance key process areas (KPA). The evaluation of vendor performance is performed by executing customer satisfaction survey on a periodical basis with respect to IT sourcing strategy, sourcing management and governance aspects for underlying IT sourcing Initiatives, programs and associated vendor organization. This module evaluates from sourcing governance aspects on supplier strengths and weaknesses, pinpoint the issues, risks and identify opportunities for improvement and providing a mechanism for feedback loop, track and perform trend analysis on vendor performance and value.

The value management reporting module is configured to establish and prioritize a plurality of sourcing objectives, identify a plurality of key value drivers with respect to the plurality of sourcing objectives for the underlying IT sourcing initiatives and programs, establish financial and non-financial key performance indicators, govern the plurality of key value drivers, perform a value driver analysis and generate a value management report with a feedback loop mechanism. This module monitor, tracks and report the buyer's outsourcing oversight and management around the value drivers that generate business value by overseeing the delivery of outsourcing services, outsourcing results and outcomes, responsible for realization of program benefits across suppliers and retained functions, such as strategic project management, program management, innovation management, IT sourcing programs, initiatives and performance management etc.

The contract compliance audit module is configured to ensure vendor contract compliance through contract compliance audits by monitoring the compliance, risk and performance. This module governs vendor compliance, performance against a contract by ensuring the health of the contract, underlying contract terms and conditions and identify opportunistic areas of improvement, effectively manages the issues, and risks by providing audit resolution, sustained cost management, savings and recovery opportunities. This module further provides an effective contract management through the audit report, proactive risk management, a feedback loop mechanism with deep insights, knowledge and greater degree of managing the controls over the relationship partners in order to meet the strategic sourcing objectives, contract performance and supplier adherence on contract compliance.

The contract evaluation analysis module is configured to improve their contracting process, procedures to ensure that the client organization will benefit from the terms and conditions of any contract that has been established or likely to be established with their suppliers. This module provides a deep insight evaluation analysis on the contract, regulatory, sourcing management and governance aspects and generates a contract evaluation report with prescriptive recommendations through a feedback loop mechanism. This module also adheres to sound and repeatable steps of contracting procedures for client organization are difficult to measure in terms of efficiency, risk, price compliance, SLAs, and the like and provide the opportunistic areas for improvements that address the issues, risks and disputes.

The service delivery management module is configured to track, manage and report the vendor performance data of a plurality of IT service delivery functions to meet service support requirements of the customer organization for the respective IT sourcing initiative or program.

The sourcing governance management module is configured to enable governance of a plurality of key process areas (KPA), key performance indicators (KPI) among the plurality of key stakeholders utilizing management dashboards and scorecards. The plurality of key process areas includes obligation management, contract compliance management; spend visibility management and reporting, value management reporting, vendor contract compliance audits, contract evaluation analysis, contract change management, vendor performance management, customer satisfaction management, issue and risk management, audit tracking, cost leakages and streamlined, automated process and governance mechanism.

The sourcing management governor (SMG) enhances and optimizes relationship between the vendor organization and the customer organization utilizing the contract compliance management module, the financial management module, the value management module, the contract compliance audit module, the contract evaluation analysis module, the performance management module, the service delivery module and the sourcing governance management module regardless of the scope, objectives, contract, IT sourcing program, vendor, service delivery location, region, country and business units throughout the sourcing lifecycle.

In one aspect, the present invention provides a computer implemented method of assigning responsibility, accountability, monitoring and reporting of sourcing governance for multi geography, multi-sourced IT services in a multi vendor environment, the method including the steps of: defining a plurality of sourcing governance reference data, a plurality of governance service delivery functions, defining collections of various governance processes and services that are to be provided by several service providers, providing metrics associating the governance, risk and compliance, performance, service delivery functions with the collections of governance functions and IT services, and inserting the metrics (such as KPI) into a governance model to indicate which service providers are complying, performing, providing value added services for the IT services and service delivery functions which they are responsible for.

In accordance with another exemplary embodiment of the present invention, a non-transitory computer-readable medium comprises computer-executable instructions stored therein for causing a computer to implement a program executable on an integrated governance solution framework for outsourcing management and governance for multi geography, multi sourcing and multi vendor environments.

The present invention aims to overcome, or at least alleviate, some or all of the aforementioned problems in sourcing management and governance arena. These and other advantages and features of the present invention are described with specificity so as to make the present invention unique in functional capabilities.

None of the conventional methods and systems uses an integrated governance solution framework that combines governance, compliance, risk and performance management, vendor portfolio management, and enterprise solution architecture to direct and prioritize IT sourcing business transformation investments to those activities that have the best impact on the (bottom-line) financial performance, expected business outcomes and benefits for the client enterprise.

BRIEF DESCRIPTION OF THE DRAWINGS

The drawing figures described below set out and illustrate a number of exemplary embodiments of the disclosure. Throughout the drawings, like reference numerals refer to identical or functionally similar elements. Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Figure 1A:
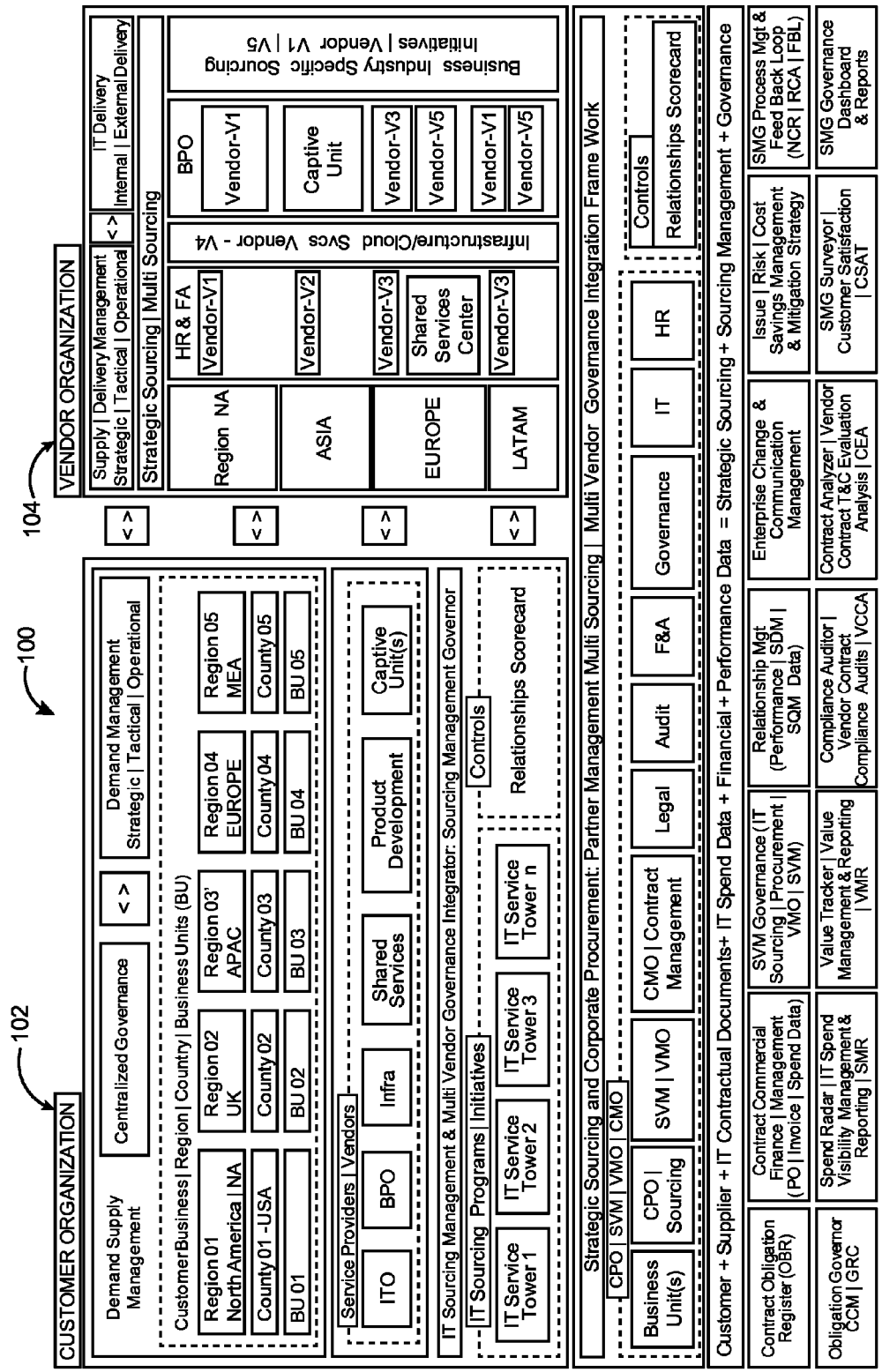
FIG. 1A illustrates a schematic diagram of an integrated governance solution framework for outsourcing management and governance for multi geography, multi sourcing and multi vendor environments in accordance with an embodiment of the present invention.

In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawing which does not limit the scope and the ambit of the invention.

The present invention provides an integrated governance solution platform by providing consistent standardized governance process mechanism, collaborates all key stakeholders of supplier and client organizations across the sourcing and vendor management value chain seamlessly on various IT sourcing initiatives cut across different region, country and business units. The present invention addresses the operational, efficiency, cost, sourcing management and governance areas such as: difficulty of managing complex outsourcing deals, contract management issues, poor risk management mechanism, increase in IT management costs, regulatory impacts, disparate IT service contracts, purchase orders, and invoices, business-IT alignment issues, lack of supplier collaboration, lack of supplier competitiveness, service delivery and performance management issues, value leakages, inappropriate governance mechanism, lack of processes, tools, and governance structure, standards, inconsistency across various IT environments, processes, support tools, and reporting mechanisms across the sourcing management and governance landscape and lack of retained control measures of all policies, standards, and common processes to ensure consistent service delivery from all providers.

A standard operating environment and an integrated governance solution ensures these services are carried out in a globally consistent manner among multiple IT service towers, business units, and service providers. The present invention helps in achieving the sourcing objectives and ensures an effective supplier governance to support the business, and to maximize value by mitigating risk. The cohesive IT sourcing governance management solution framework connects the delivery of IT work to the business value chain, supports sourcing business objectives, and ensures service integrity to manage, maintain and improve service provider interactions in a multi-sourced, multi vendor environment, proactively identify and mitigate the business risk and enable timely business outcomes and sustainable business benefits.

The present invention provides a mechanism to resolve customer organizations' IT alignment issues in a more effective way by managing tracking and reporting various cost management KPIs to achieve the required sourcing business objectives. This provides a unique way of managing supplier interactions and accountabilities to meet business objectives and deliver value across the sourcing lifecycle. The present invention is developed to integrate multiple suppliers to manage better outcomes and assess supplier effectiveness, leverage supplier capabilities to ensure business objectives are met, enable competitive advantage by enhancing IT alignment to the business strategy, optimize the potential for business growth by increasing responsiveness to the changing business needs and transform the IT cost structure by taking full advantage of economies of scale and standardized services.

Figure 1B:
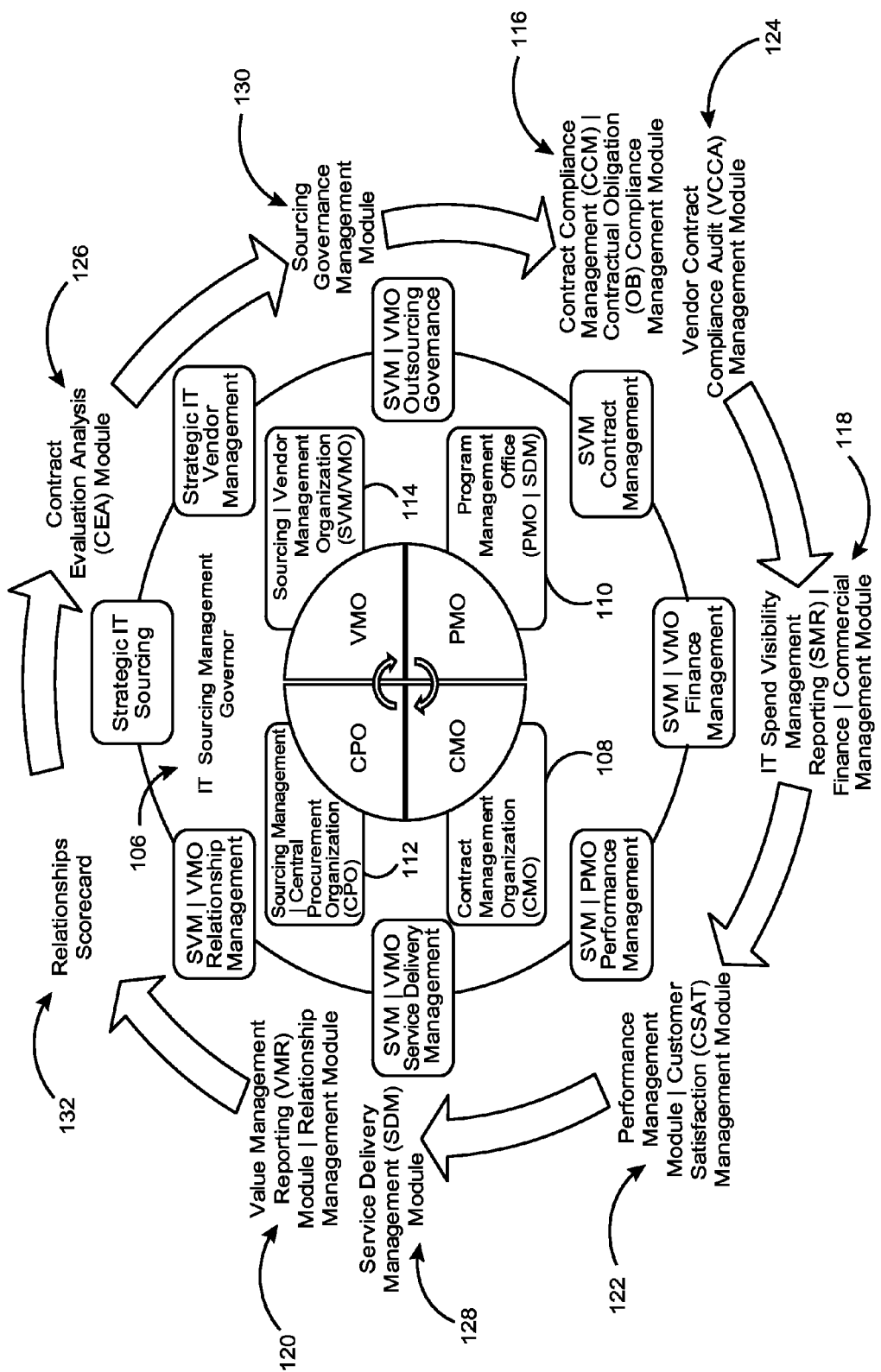
FIG. 1B illustrates a schematic diagram of a sourcing management governor for managing, monitoring, tracking and reporting effective governance between a customer organization and a vendor organization throughout a sourcing lifecycle in accordance with an embodiment of the present invention.

Turning first to FIGS. 1A-1B, a schematic diagram of an integrated IT sourcing management governance solution framework 100 for outsourcing management and governance for multi geography, multi sourcing and multi vendor environments in accordance with an embodiment of the present invention is illustrated. The integrated solution framework 100 includes one or more participants such as a customer organization 102, a vendor organization 104, a contract management organization (CMO) 108, a program management office (PMO) 110, a sourcing management-|central procurement organization (CPO) 112, and a sourcing|vendor management organization (SVM|VMO) 114.

As used herein, the term customer organization 102 includes a client, a buyer, or a purchaser that is the recipient of goods or IT services obtained from the vendor organization 104 for a monetary or other valuable consideration. The customer organization 102 employs right resources and governance tools for effectively managing vendor relationships from sourcing governance aspects. As used herein, the vendor organization 104 includes one or more individual or groups of vendors, suppliers, manufacturers, resellers, retailers, owners, service providers, consulting, advisory companies, and any other person or enterprise that provides goods or services to a company or buyers of IT outsourcing or individuals. The vendor organization 104 is committed to manage contract between vendor organization 104 and customer organization 102 in effective governance processes.

As used herein, the contract management organization (CMO) 108 manages contracts made with vendor organization 104 and the customer organization 102. Contract management includes negotiating the terms and conditions in contracts and ensuring compliance with the terms and conditions, as well as documenting and agreeing on any changes or amendments that may arise during its implementation or execution. It includes the process of systematically and efficiently managing contract creation, execution, modification and analysis for the purpose of maximizing financial and operational performance and minimizing risk during the contract lifecycle. The contracts include Letter of Intent (LOI), Master Service Agreement (MSA), Global Service Agreement (GSA), Statement of Work (SOW), Contract Change Notes (CCN) and Change Requests (CR) and any other agreements governing sharing of information.

As used herein, the program management office (PMO) 110 is a group or department within a business, agency or enterprise that defines, maintains, manages and tracks various IT sourcing initiatives or large scale enterprise wise initiatives or programs within the customer organization 102. In one embodiment, the program management office (PMO) 110 includes one or more office members from the customer organization 102 and one or more key stakeholders across different divisions like legal, finance, IT etc. The roles and responsibilities of one or more office members and one or more track leads are defined. The program management office (PMO) 110 includes a program management execution methodology and processes which is developed for each of the IT sourcing initiatives or program or for a group of projects under one program. Based on the systemic program management and project execution methodology the schedules, deliverables, milestones, cost management and performance metrics are tracked, monitored and reported with respect to various IT sourcing initiatives, large scale enterprise transformation programs, managing multiple stakeholders and integrating various services and solutions across geographies of client organization to achieve the desired business objectives.

As used herein, the sourcing management|central procurement organization (CPO) 112 is responsible for sourcing and purchasing of goods and services for business use. CPO is involved in various supply chain activities of establishing requirements for goods and services, sourcing activities such as market research, product requirement, vendor evaluation and negotiation of contracts and managing the sourcing contracts made with vendor organization 104 and the customer organization 102. The role of sourcing management-|central procurement organization (CPO) 112 includes negotiating the terms and conditions in contracts and ensuring compliance with the terms and conditions, as well as documenting and agreeing on any changes or amendments that may arise, improving procurement compliance, optimizing processes, lowering transactional costs and increasing control over spend during its implementation or execution throughout the contract or sourcing lifecycle.

As used herein, the sourcing/vendor management organization (SVM|VMO) 114 manages the sourcing management and governance, formalizing the collaboration (communication, change management and vendor governance) across various key stakeholders (procurement|sourcing (CPO), CMO, legal, IT, business, SVM) between customer organization 102 and vendor organization 104 to effectively manage and govern the outsourcing supplier relationships.

Figure 1C:
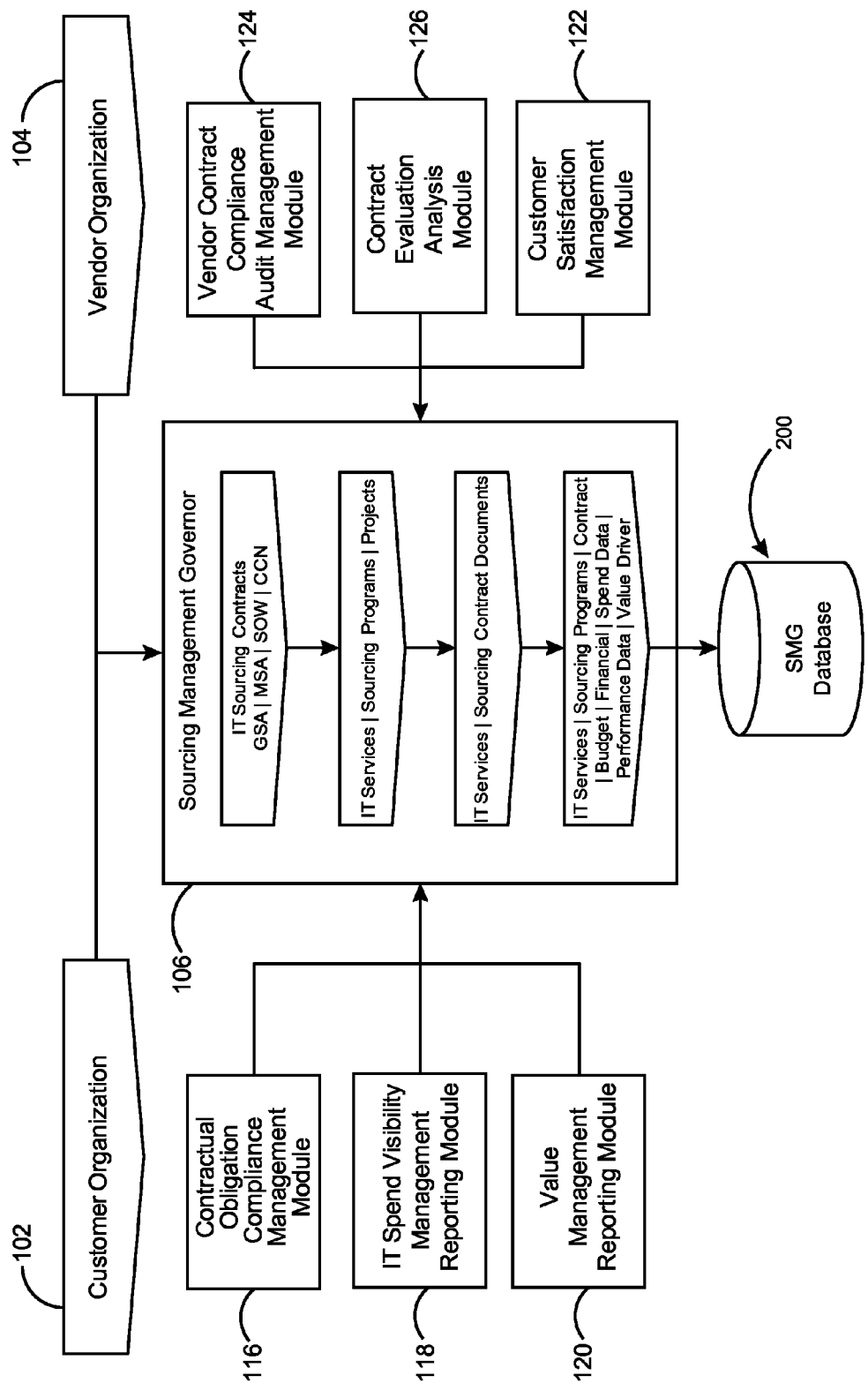
FIG. 1C shows a diagrammatic representation of independent sub-modules across sourcing management and governance lifecycle associated with sourcing management governor solution according to an embodiment of the present invention.

Referring to FIG. 1C, a diagrammatic representation of independent sub-modules across sourcing management and governance lifecycle associated with sourcing management governor solution according to an embodiment of the present invention is illustrated. In a preferred embodiment, the sourcing governance solution framework 100 comprises a sourcing management governor (SMG) 106 for managing, monitoring, tracking and reporting effective governance between the vendor organization 104 and the customer organization 102 throughout a sourcing lifecycle The sourcing management governor (SMG) 106 comprises a contract compliance management (CCM) module|contractual obligation compliance management module 116, a IT spend visibility management reporting (SMR)|financial| commercial management module 118, a relationship management module|value management reporting module (VMR) 120, a performance management module|customer satisfaction management module (CSAT) 122, a vendor contract compliance audit (VCCA) management module 124, a contract evaluation analysis (CEA) module 126, a service delivery management (SDM) module 128 and a sourcing governance management module 130. The sourcing management governor 106 includes IT sourcing contracts (GSA|MSA|SOW-|CCN), IT services|sourcing program|projects, IT services sourcing contract documents and IT services|sourcing programs|contract|budget|financial|spend data|performance data|value driver which are linked to a SMG database 200 (See FIG. 1C).

Figure 1D:
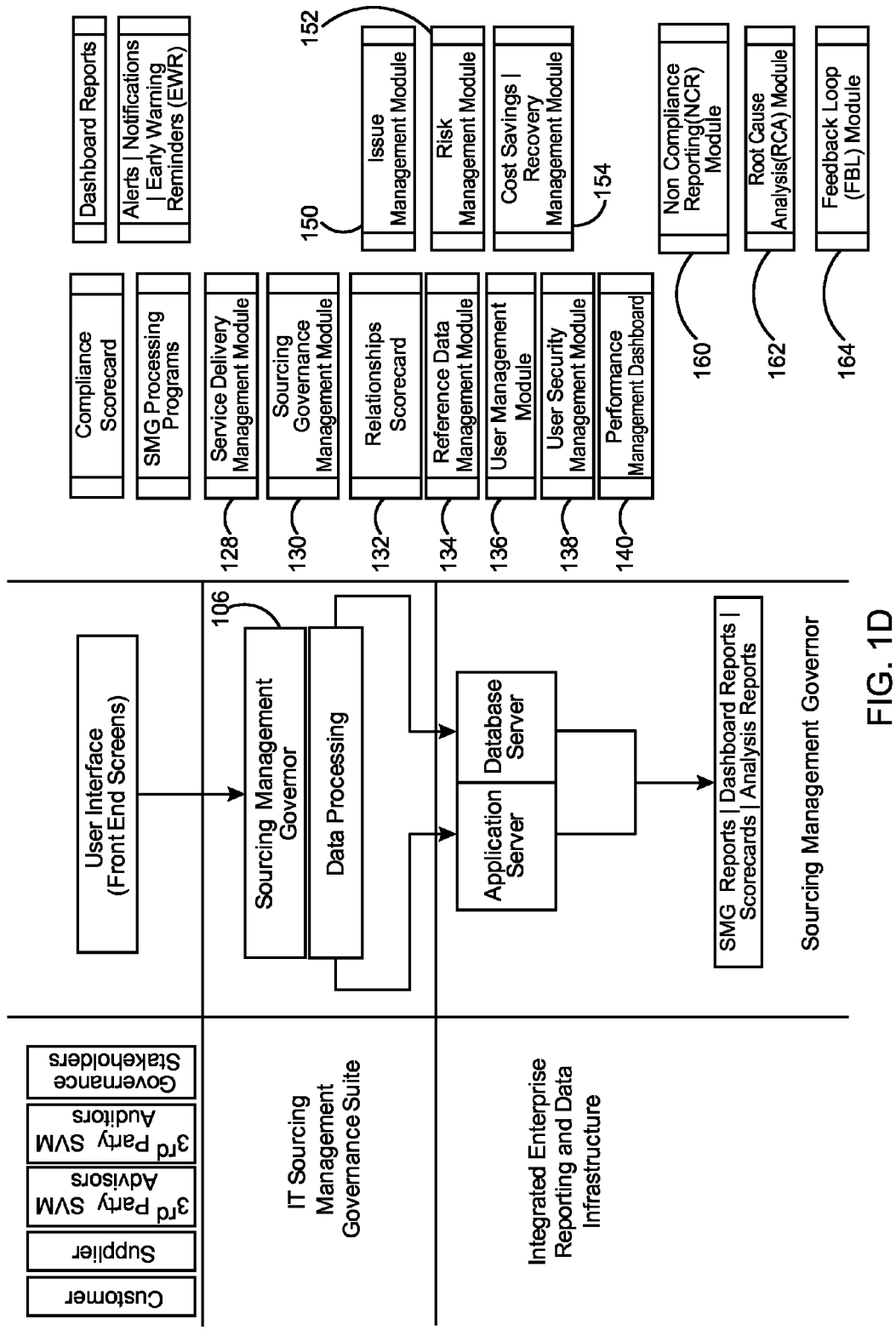
FIG. 1D is an exemplary embodiment of a sourcing management governor according to the present invention.

FIG. 1D is an exemplary embodiment of a sourcing management governor according to the present invention. The sourcing management governor (SMG) 106 enhances and optimizes relationship between the vendor organization 104 and the customer organization 102 utilizing the service delivery management (SDM) module 128, the sourcing governance management module 130, a relationships scorecard (RSC) 132, a reference data management module 134, a user management module 136, a user security management module 138, a performance management dashboard 140 and a feedback loop management module 142.

In one embodiment, the sourcing management governor (SMG) 106 includes the relationships scorecard 132 configured to manage the plurality of changes and communication of information between the vendor organization 104 and the customer organization 102 during the sourcing lifecycle. The relationships scorecard 132 includes a change management report, the change strategies and cost analysis plan.

In one embodiment, the sourcing management governor (SMG) 106 includes the reference data management module 134 configured to manage the plurality of metadata|reference information pertaining to sourcing management and governance aspects between the vendor organization 104 and the customer organization 102.

In one embodiment, the sourcing management governor (SMG) 106 includes the user management module 136 configured to manage the plurality of user information intended to use the sourcing management governor 106 between the vendor organization 104 and the customer organization 102.

In one embodiment, the sourcing management governor (SMG) 106 includes the user security management module 138 configured to manage the plurality of user data|application mapping|security information pertaining to sourcing management governor 106 aspects between the vendor organization 104 and the customer organization 102.

In one embodiment, the sourcing management governor (SMG) 106 includes a performance management module-|customer satisfaction management module (CSAT) 122 that is configured to enable governance of a plurality of directions for effective decision management in various sourcing governance a plurality of key process areas (KPA) and a plurality of key performance indicators (KPI) that are defined by the plurality of various governance organization (SVM|VMO) key stakeholders by utilizing dashboards, scorecards, analysis and variance reports. The plurality of key process areas includes contractual obligation management|contract compliance management 116, financial|commercial management|IT spend visibility management and reporting 118, value management reporting 120, vendor contract compliance audits 124, contract evaluation analysis 126, contract change management, vendor performance management, customer satisfaction management 122, issue and risk management, governance, risk, compliance, spend compliance and value leakages are streamlined.

The performance management dashboard 140 is configured to enable governance of a plurality of directions by facilitating a mechanism for handling and managing the issues, risks and cost management from sourcing governance aspect. In one embodiment, the sourcing management governor (SMG) 106 includes an issue management module 150 for identifying, analyzing, handling, and monitoring issues associated with the vendor organization 104 and the customer organization 102. The issues are then managed effectively through effective issue-dispute mitigation strategies by appropriate governance process like issue-dispute management, issue management reporting, non compliance reporting, change management processes and the plurality of key process areas covering contractual obligation management|contract compliance management 116, financial|commercial management|IT spend visibility management and reporting 118, value management reporting 120, vendor contract compliance audits 124, contract evaluation analysis 126, contract change management, vendor performance management, and customer satisfaction management 122. The issue management module 150 includes a plurality of issue strategies, a list of all issue disputes and an issue management tracker with status for the identified key stakeholders or key process areas for the respective sourcing initiative and key process areas for the respective sourcing initiative.

In one embodiment, the performance management dashboard 140 includes a risk management module 152 for identifying, analyzing, handling, and monitoring risks associated with the vendor organization 104 and the customer organization 102. The risks are then managed effectively through risk mitigation strategies by appropriate governance process like issue-dispute management, risk management reporting, non compliance reporting, change management processes and the plurality of key process areas covering contractual obligation management|contract compliance management 116, financial|commercial management|IT spend visibility management and reporting 118, value management reporting 120, vendor contract compliance audits 124, contract evaluation analysis 126, contract change management, vendor performance management, customer satisfaction management 122. The risk management module 152 includes the plurality of risks strategies, a list of all risks and a risk status for the identified key stakeholders and key process areas for the respective sourcing initiative.

In one embodiment, the performance management dashboard 140 includes a cost savings recovery management module 154 for identifying, analyzing, handling, and monitoring cost management issues associated with the vendor organization 104 and the customer organization 102. The cost management issues are then managed effectively through effective cost management issue-dispute mitigation strategies by appropriate governance process like issue-dispute management, risk management reporting, non compliance reporting, cost management reports (Analysis and variance reports), change management processes and the plurality of key process areas covering contractual obligation management|contract compliance management 116, financial|commercial management|IT spend visibility management and reporting 118, value management reporting 120, vendor contract compliance audits 124, contract evaluation analysis 126, contract change management, vendor performance management, customer satisfaction management 122. The cost savings|recovery management module 154 includes the plurality of cost management issue strategies, a list of all cost management issue disputes and a cost management issue tracker with status for the identified key stakeholders and key process areas for the respective sourcing initiative.

The performance management dashboard 140 is configured to enable governance of a plurality of directions by facilitating a feedback loop (FBL) mechanism for continual improvements and sustained performance includes a non-compliance reporting (NCR) module 160, root cause analysis (RCA) module 162 and a feedback loop (FBL) module 164.

This feedback loop (FBL) module 164 provides a plurality of directions for effective decision making and continua improvements during the lifecycle of the sourcing program or initiative. The sourcing governance management feedback modules (NCR, RCA and FBL) ensure alignment of the strategic objectives with business strategy and direction. The sourcing governance management module 130 enhances the governance processes and effective practices by embedding the appropriate governance, risk, compliance and performance measures and service quality improvements in the form of the dashboards, reports, analysis that results in improved operational outcomes, enhanced customer satisfaction, optimized to deliver value against the sourcing objectives, proactive risk management, effective decision management, to capture incremental and sustained value on an ongoing basis over the life of the sourcing deal.

The sourcing management governor (SMG) 106 enhances and optimizes relationship between the vendor organization 104 and the customer organization 102 utilizing the contract compliance management (CCM) module|contractual obligation compliance management module 116, the IT spend visibility management reporting (SMR)|financial|commercial management module 118, the relationship management module|value management reporting module (VMR) 120, the performance management module|customer satisfaction management module (CSAT) 122, the vendor contract compliance audit (VCCA) management module 124, the contract evaluation analysis (CEA) module 126, the service delivery management (SDM) module 128, the sourcing governance management module 130, regardless of the scope objectives, contract, IT sourcing program, vendor, service delivery location and region, country and business units throughout the sourcing lifecycle. The sourcing management governor (SMG) 106 also provides strategic insights about contract terms, financial performance, commercial management, service delivery, contractual obligations, compliance, cost, risk, vendor performance and the relationship with the external or extended partners.

In one embodiment, at the strategic level, the sourcing management governor (SMG) 106 provides support for effective decision making and allow an enterprise view of supplier relationships, contract compliance management, effective vendor governance, financial and commercial management, vendor performance, and outsourcing strategy by utilizing the contract compliance management (CCM) module|contractual obligation compliance management module 116, the IT spend visibility management reporting (SMR) |financial|commercial management module 118, the relationship management module|value management reporting module (VMR) 120, the performance management module-|customer satisfaction management module (CSAT) 122, the vendor contract compliance audit (VCCA) management module 124, the contract evaluation analysis (CEA) module 126, the service delivery management (SDM) module 128, the sourcing governance management module 130. For instance, the performance management module|customer satisfaction management module (CSAT) 122 evaluates the vendor performance through the customer satisfaction (CSAT) survey.

In one embodiment, at the tactical level, sourcing management governor (SMG) 106 enables management oversight of external suppliers, the retained internal organizations and provides operational decision making support through advanced control and governance mechanisms through value management and reporting (VMR) 120, service delivery management 128, contract evaluation analysis (CEA) 126 by utilizing the relationship management module|value management reporting module (VMR) 120, the vendor contract compliance audit (VCCA) management module 124, the service delivery management (SDM) module 128 and the sourcing governance management module 130. For instance, the contract evaluation analysis (CEA) module 126 includes analysis of the new vendor contracts and improvement opportunities in a proactive mode to adopt and enhances the contract management process, procedures and practices.

In one embodiment, at the operational level, sourcing management governor (SMG) 106 enables a sourcing and vendor management (SVM) processes, such as SVM governance including vendor contract compliance audits (VCCA) and risk, issue escalation, conflict resolution such as obligation management, communications management and continual improvements utilizing the contract compliance management (CCM) module|contractual obligation compliance management module 116, the vendor contract compliance audit (VCCA) management module 124 and the sourcing governance management module 130. The sourcing management governor (SMG) 106 also provides transparency through the service area view of performance, log of contract change & service provision, issue dispute resolutions, value leakages and service quality management aspects.

Figure 1E:
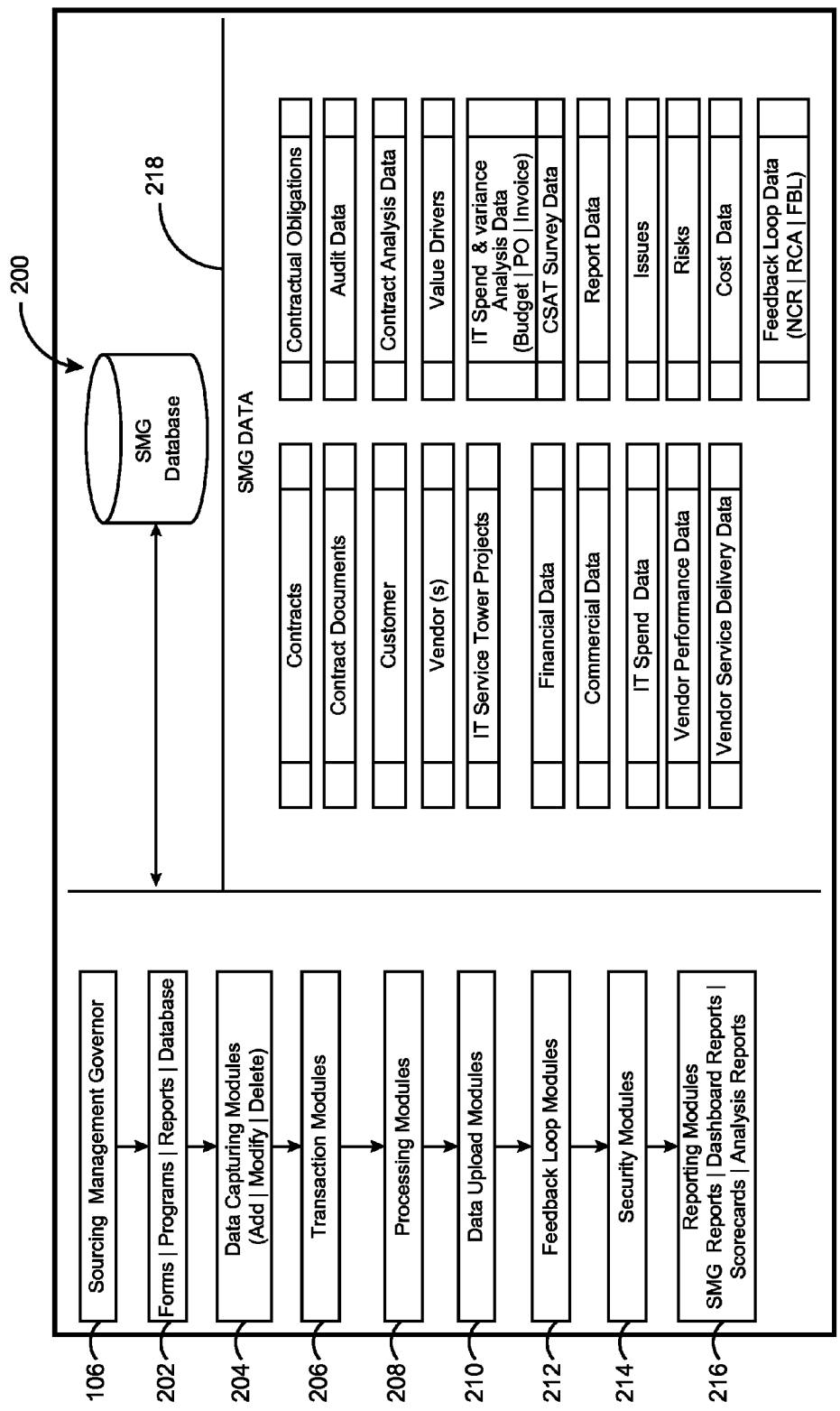
FIG. 1E is an exemplary embodiment of a sourcing management governor, the underlying process modules and the data elements according to the present invention.

FIG. 1E is an exemplary embodiment of the sourcing management governor 106, the underlying process modules and the data elements according to the present invention. The underlying process modules include forms|programs|reports|database 202, data capturing modules 204, transaction modules 206, processing modules 208, data upload modules 210, feedback loop modules 212, security modules 214 and reporting modules 216 including SMG reports|dashboard reports|scorecards|analysis reports. The SMG 106 includes a SMG database 200 that manages the SMG data 218. The SMG data 218 includes a plurality of data comprising: contracts, contract documents, customer, vendor, IT service tower projects, financial commercial data, IT spend data, vendor performance data, vendor service delivery data, contractual obligations, audit data, contract analysis data, value drivers, IT spend and variance analysis data, CSAT survey data, report data, issues, risks, cost data and feedback loop data.

Figure 1F:
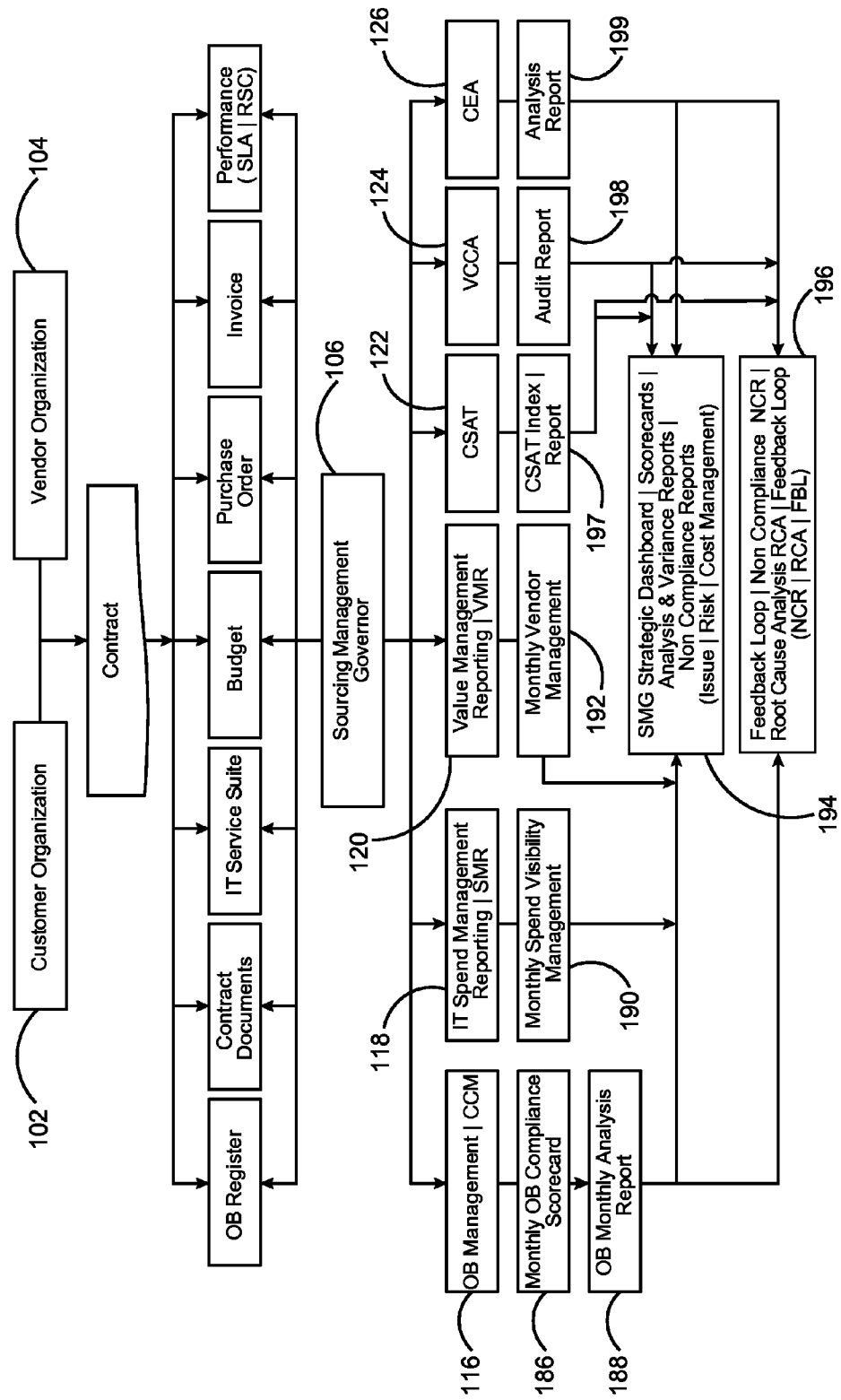
FIG. 1F is an exemplary embodiment of a sourcing management governor, key entities and the core functional modules according to the present invention.

FIG. 1F is an exemplary embodiment of a sourcing management governor, key entities and the core functional modules according to the present invention. The sourcing management governor 106 manages contract between vendor organization 104 and customer organization 102 effectively. The contracts include contracts pertaining to obligation register, contract documents, IT service suite, budget, purchase order, invoice and performance (SLA|RSC). The core functional modules such as the contract compliance management (CCM) module 116, the IT spend visibility management reporting (SMR)|financial|commercial management module 118, the relationship management module|value management reporting module (VMR) 120, the performance management module|customer satisfaction management module (CSAT) 122, the vendor contract compliance audit (VCCA) management module 124 and the contract evaluation analysis (CEA) module 126. The CSAT 122, the VCCA 124 and the CEA 126 generates CSAT index report 197, audit report 198 and analysis report 199 respectively. The monthly transactions updates such as monthly OB compliance scorecard 186, OB monthly analysis report 188, monthly spend visibility management 190 and monthly vendor management 192 are performed with appropriate issue|risks|cost savings. The relationships scorecard (RSC) 132 provides the final output on the strategic dashboard 194. Finally, the feedback loop, non-compliance, root cause analysis and action plan (NCR, RCA and FBL) are performed as shown at block 196.

Figure 1G:
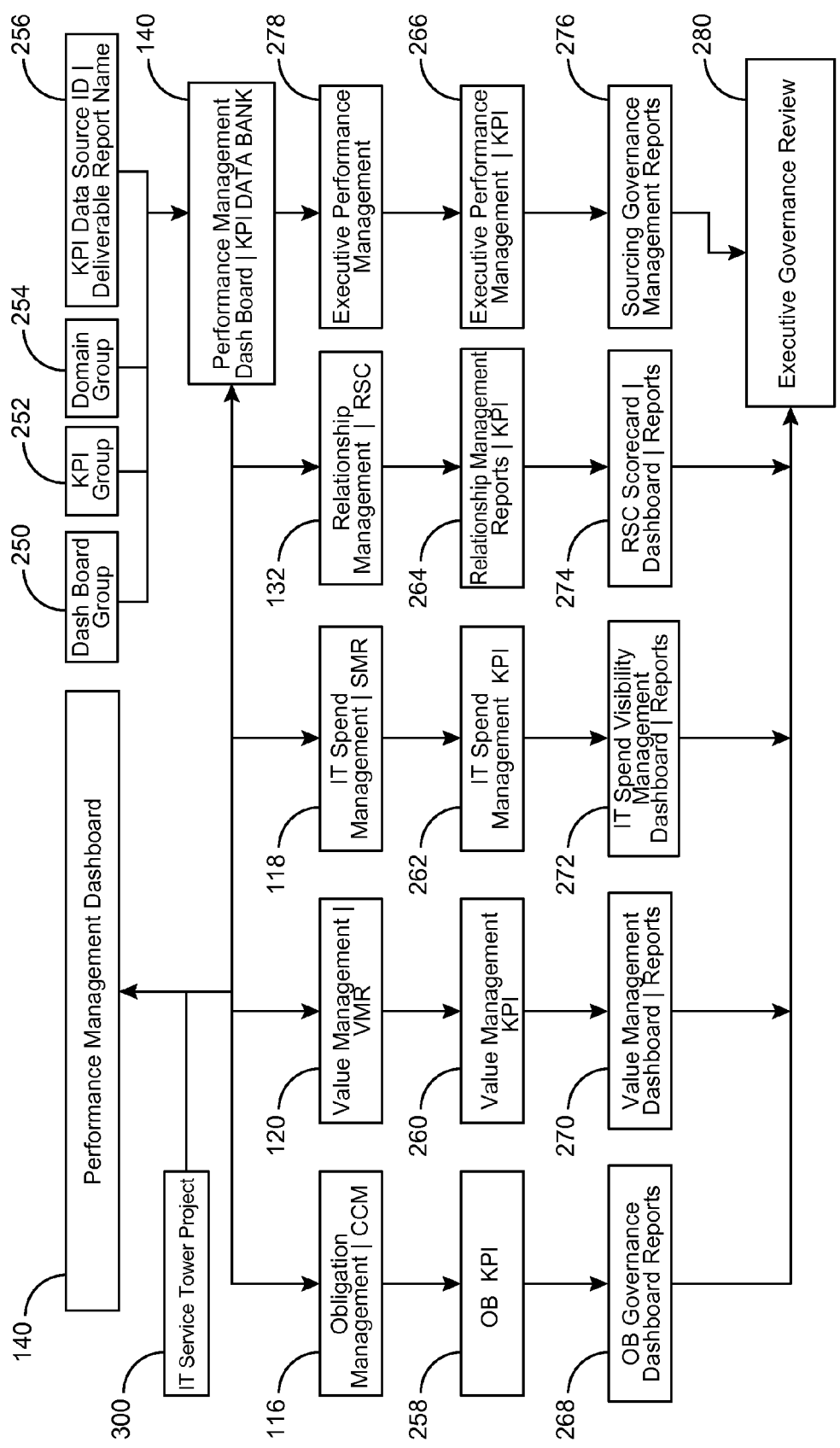
FIG. 1G illustrates a schematic diagram of an exemplary operational process model for governance|performance management module, KPI aligned metric for use according to in accordance with an embodiment of the present invention.

FIG. 1G illustrates a schematic diagram of an exemplary operational process model for governance|performance management module, KPI aligned metric for use in accordance with an embodiment of the present invention. The SMG 106 integrates with the IT service tower project to enhance the governance processes and effective practices in the plurality of key process areas (KPA) utilizing a performance management dashboard 140. The performance management dashboard 140 is updated with dashboard group 250, KPI group 252, domain group 254 and KPI data source ID|deliverable report name 256 in an automated manner. The plurality of key process areas (KPA) includes contractual obligation compliance management|CCM 116, value management reporting|VMR 120, IT spend visibility management|SMR 118, relationships scorecard 132 and executive performance management 278. As shown at blocks 258, 260, 262, 264 and 266, the contractual obligation compliance management|CCM 116, value management reporting|VMR 120, IT spend visibility management|SMR 118, relationships scorecard 132 and executive performance management 278 are updated with the key performance indicator (KPI). As indicated at blocks 268, 270, 272, 274 and 276, contractual obligation compliance management dashboard|reports, value management reporting dashboard|reports, IT spend visibility management dashboard|reports, relationships scorecard dashboard|reports and sourcing governance management reports are generated to enable an effective governance process across sourcing and vendor management value chain cut across the plurality of key process areas (KPAs). Finally, an executive governance review plan is executed as indicated at block 280.

Figure 2:
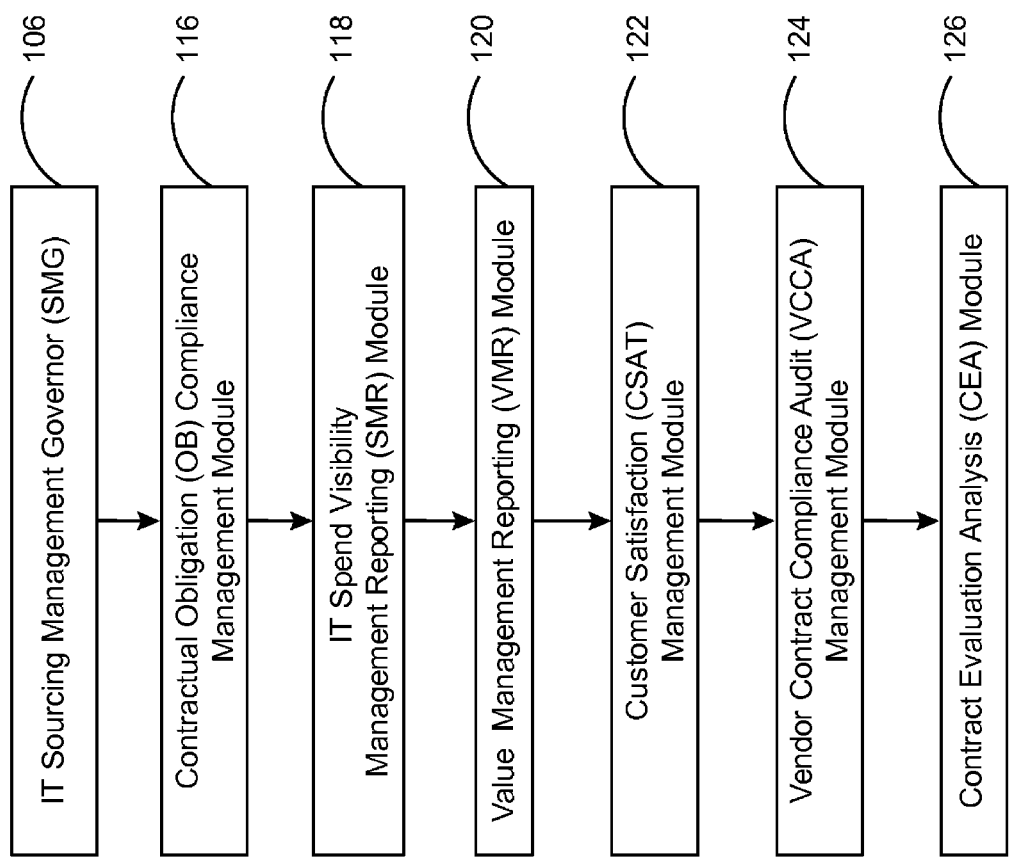
FIG. 2 shows the different functional modules for the sourcing governance solution framework according to the present invention.

Referring to FIG. 2, different functional modules for the sourcing governance solution framework according to the present invention is illustrated. The different functional modules include IT sourcing management governor (SMG) 106, contract compliance management (CCM) module|contractual obligation compliance management module 116, IT spend visibility management reporting (SMR)|financial-|commercial management module 118, relationship management module|value management reporting module (VMR) 120, performance management module|customer satisfaction management module (CSAT) 122, vendor contract compliance audit (VCCA) management module 124 and contract evaluation analysis (CEA) module 126.

Figure 3:
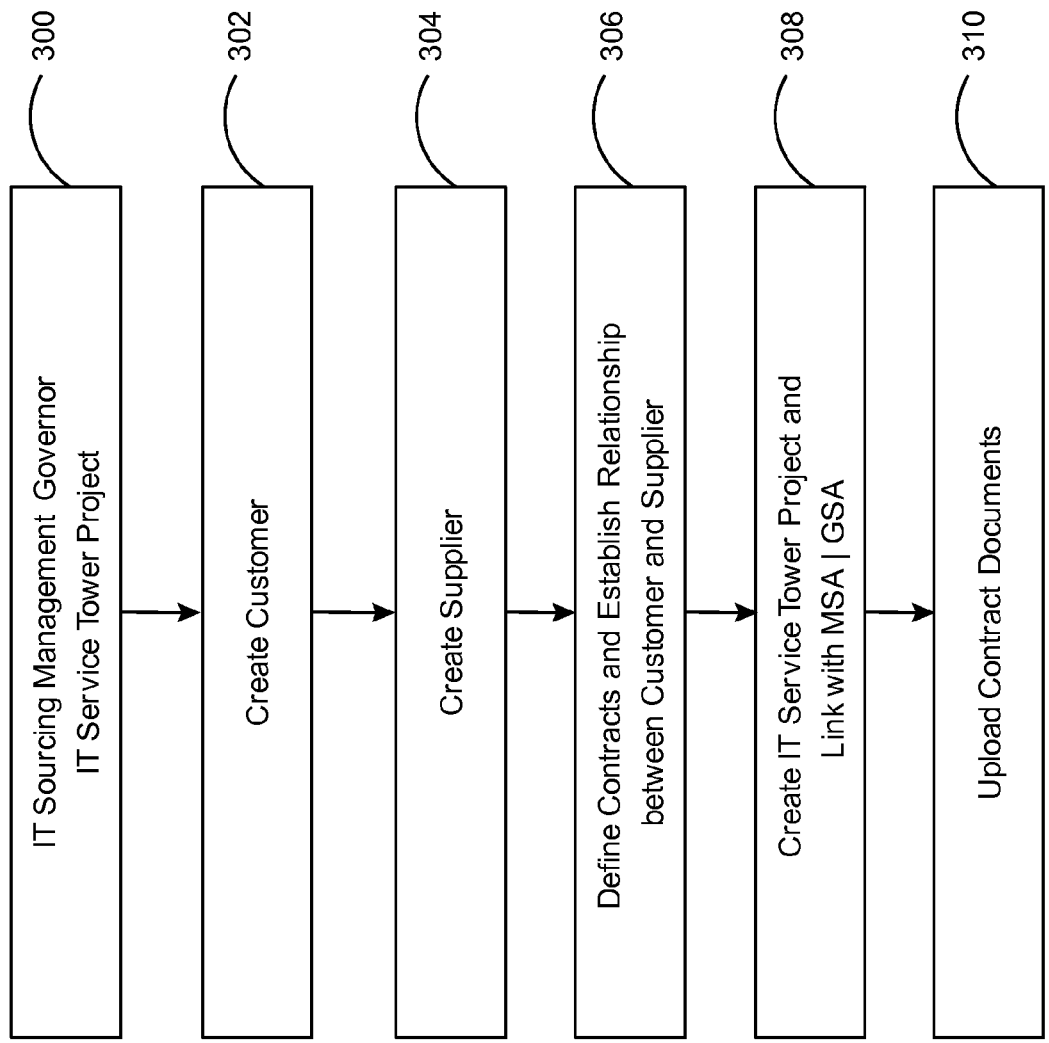
FIG. 3 illustrates a flow diagram of an exemplary operational process model for a IT service tower project (sourcing initiative/program) in accordance with an embodiment of the present invention.

Turning to FIG. 3, a flow diagram of an exemplary operational process model for an IT service tower project in accordance with an embodiment of the present invention is illustrated. The IT sourcing management governor (SMG) 106 tracks, monitors, and manages IT service tower project (sourcing initiatives programs) 300. The customer and vendor are registered with the IT service tower project 300 as indicated at blocks 302 and 304 respectively. The contracts are defined and the customer and vendor relationship is established as shown in block 306. As indicated at block 308, the IT service tower project is then created and linked with the Global Service Agreements (GSA)|Master Service Agreement (MSA). Finally, the contract documents are uploaded as shown in block 310.

Figure 4:
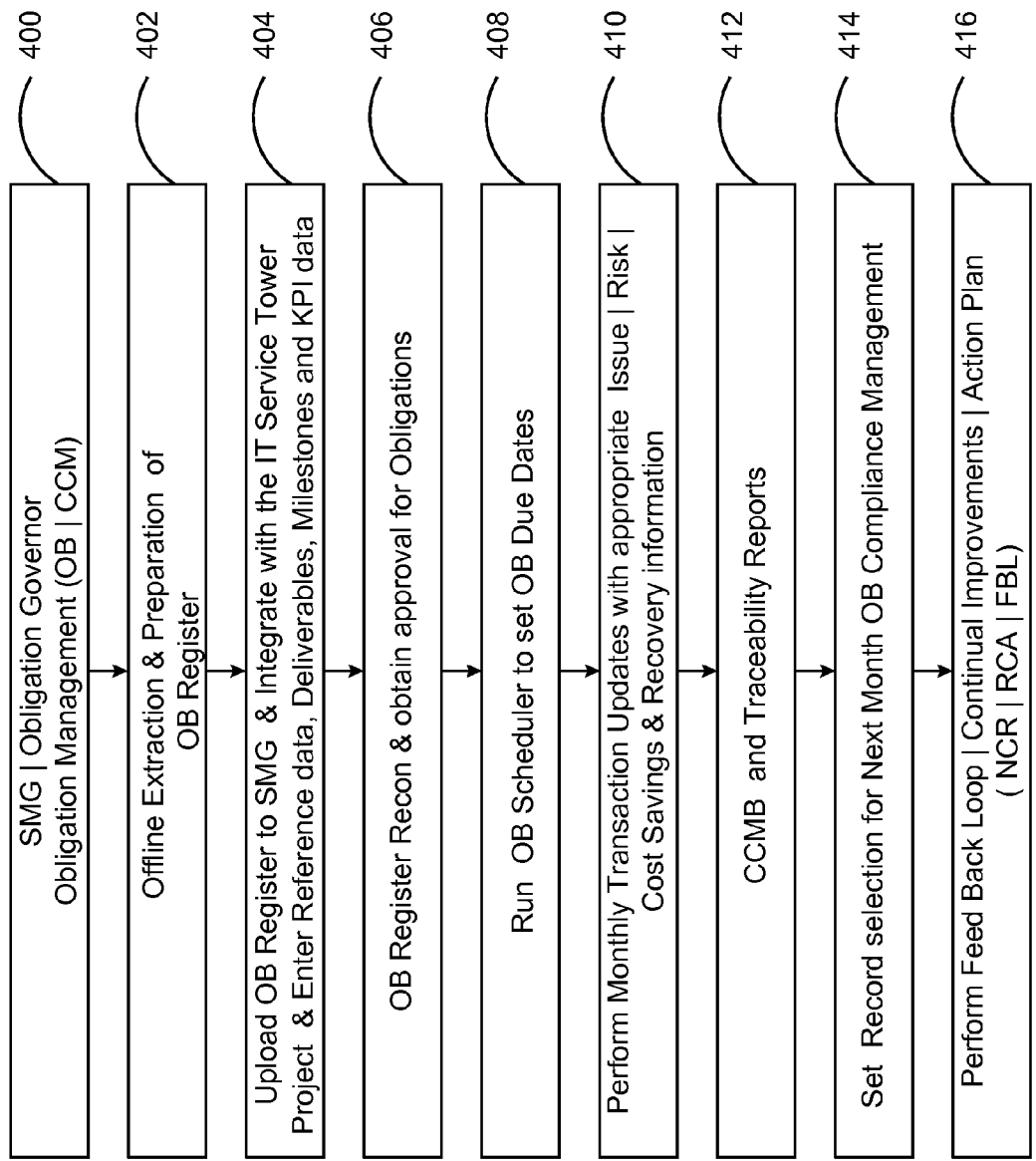
FIG. 4 illustrates a schematic diagram of an exemplary operational process model for a contract compliance management (CCM/obligation management) module in accordance with an embodiment of the present invention.

Referring to FIG. 4, a flow diagram of an exemplary operational process model for the contract compliance management (CCM) module|contractual obligation compliance management module 116 in accordance with an embodiment of the present invention is illustrated. The contract compliance management (CCM) module|contractual obligation compliance management module 116 enables the offline extraction and preparation of obligation (OB) register from contract documents (MSA|SOW) to obligations with appropriate reference data as shown in blocks 400 and 402. Then, the OB register is uploaded to sourcing management governor (SMG) 106 and integrated with the IT service tower project 300 and the OB register is updated with reference data, deliverables, milestones and KPI data as shown in block 404. As indicated at block 406, the OB register is reconciled and approval for obligations is obtained. The obligation scheduler is then run to set OB due dates as shown in block 408. The monthly transactions update are performed with appropriate issue|risks|cost savings and recovery information as shown in block 410. As indicated at block 412, the record locking is applied and monthly OB compliance scorecard, contract change management board (CCMB) and traceability reports are generated. The record selection for the following month obligation compliance management is set as shown in block 414. Finally, the feedback loop, continual improvements and action plan (NCR, RCA and FBL) are performed as indicated at block 416.

The contract compliance management (CCM) module|contractual obligation compliance management module 116 tracks, monitor and report the plurality of contractual obligations between the vendor organization 104 and the customer organization 102 as shown in FIG. 1E. The plurality of contractual obligations is extracted from contract documents in contract repository. The contract documents in the contract repository include Global Service Agreements (GSA), Master Service Agreement (MSA), the Statement of Work (SOW), schedules, Service Level Agreement (SLA) and contract clauses (T&C). The plurality of contractual obligations is interpreted from contract language in legal, business terms and defined into commitments, service levels, milestones and deliverables by the customer organization. Then, the extracted plurality of contractual obligations is marked with an obligation ID, an obligation type, a severity, obligation start date, end date, due date, a remark with status and other tracking parameters. The plurality of contractual obligations is compiled into obligation register as per the agreement|contract in line with organization policies covering various domains including a Human Resource (HR), a chief procurement officer (CPO), legal, finance, compliance, the Sourcing and Vendor Management (SVM) and an IT.

The contract compliance management (CCM) module-|contractual obligation compliance management module 116 monitors and manages changes in the plurality of contractual obligations with respect to changing business needs in a transparent and collaborative manner. The contract compliance management (CCM) module|contractual obligation compliance management module 116 further establishes an obligation traceability matrix including changes in the plurality of contractual obligations and generates an obligation management report with a feedback loop as indicated at block 416. The obligation traceability matrix is linked to business policy, process, procedure and personnel. The obligation traceability matrix provides obligation visibility, obligation cost improvement system, effective decision management and reporting capabilities enabling governance of the sourcing relationships, managing and mitigating effective risk management and delivery value. The obligation traceability matrix ensures that the contractual baseline is established, tracked and reported with historical changes. Contract deliverables focuses on performance measurement and contractual requirement definitions. In contract compliance management module (contractual obligation compliance management), the underlying contract management process and the contract compliance management provides all key business stakeholders with an early warning system that provides finance, legal, procurement, sourcing, IT, business, sales and other key stakeholders with alerts and management information on milestones, deliverables and obligations that need to be managed to avoid unnecessary cost, identifying appropriate issues and risks and to exploit maximum value out of contracted terms and conditions. The obligation management report facilitates the listing of details of the plurality of contractual obligations with appropriate status, risk and mitigation plan for any obligations which are marked with risk category.

In an embodiment, the contract compliance management (CCM) module|contractual obligation compliance management module 116 manages integration across different vendor organizations in the multi sourcing and multi geography environment and relationship between IT services employed by the vendor organizations. In an embodiment, the contract compliance management (CCM) module|contractual obligation compliance management module 116 tracks, monitors and manages contractual obligations and link service provider performance to contractual terms and obligations for each contract regardless of the complexity of the contract, IT services, vendors, service delivery location and the region, country and the business units with a feedback loop mechanism. In an embodiment, the contract compliance management (CCM) module|contractual obligation compliance management module 116 measures, monitors and reports value delivered by the vendor organization 104 against cost of servicing and the core business objectives.

Figure 5:
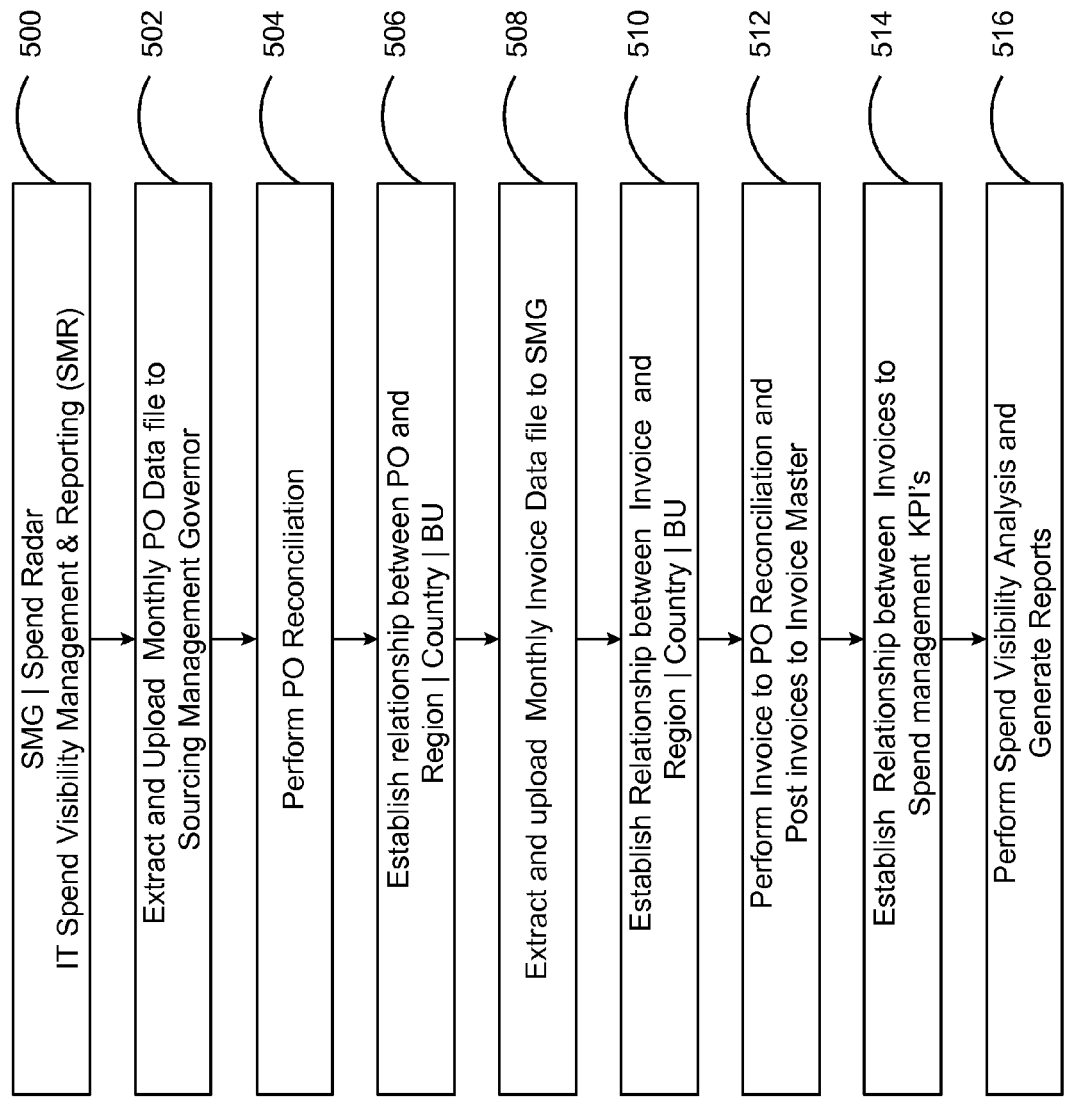
FIG. 5 illustrates a schematic diagram of an exemplary operational process model for financial commercial management|IT spend visibility management and reporting module in accordance with an embodiment of the present invention.

FIG. 5 illustrates a schematic diagram of an exemplary operational process model for financial|commercial management|IT spend visibility management and reporting module in accordance with an embodiment of the present invention. The IT spend visibility management reporting (SMR)|financial|commercial management module 118 is configured to capture, manage and monitor a spend data with respect to various IT services, IT sourcing initiatives and programs, provides spend visibility analysis between an estimated budget data and the spend data as shown in FIG. 5. Also this module generates spend visibility management and analysis reports. The spend data includes categories of charges, spend allocation category and associated cost management parameters (cost savings, cost reduction, cost avoidance and charge backs). Beyond the cost benefit analysis, the spend visibility management reporting module provides an additional insight about the spend compliance, value leakages, cost savings and appropriate risk and effective control measures to govern the spend data. The spend visibility management reporting enables financial budget spend control and spend compliance with respect to the vendor organization 104. Further, the spend management reporting enables compliance with contractual commitments, business case objectives, internals and other external requirements. The external requirements include corporate reporting, statutory and audit. The IT spend visibility management reporting (SMR)|financial| commercial management module 118 measures, monitors and reports the spend data against contract, vendor, region, country, business unit and IT spend category of charges.

The IT spend visibility management reporting (SMR) |financial|commercial management module 118 identifies value leakages to achieve cost savings, cost reduction, cost recovery and cost avoidance as shown in block 500. The SMR 118 extracts and upload monthly PO data file to the sourcing management governor (SMG) 106 as shown in block 502. Then, PO reconciliation is performed as indicated at block 504. The relationship between PO and region|country|BU is established as shown in block 506. Then, the monthly invoice data file is extracted and uploaded to SMG as indicated at block 508. As shown in block 510, relationship between invoice and region|country|BU is established. Then, the invoice to PO reconciliation is performed and invoices are posted to invoice master as indicated at block 512. The relationship between invoices and spend management KPIs are established as shown in block 514. Finally, spend visibility analysis is performed and reports are generated as indicated at block 516.

Figure 6:
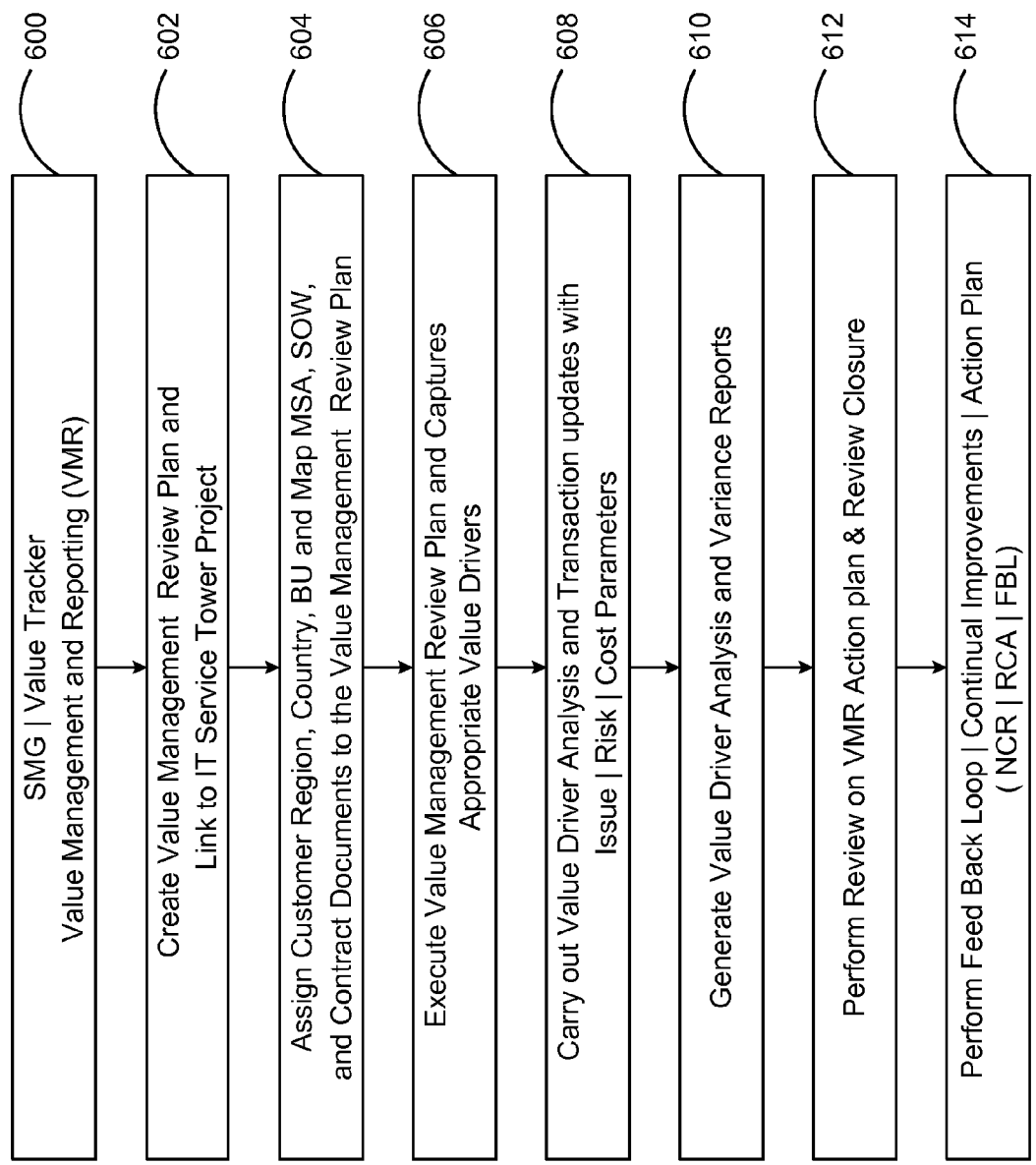
FIG. 6 illustrates a schematic diagram of an exemplary operational process model for value management and reporting module in accordance with an embodiment of the present invention.

FIG. 6 illustrates a schematic diagram of an exemplary operational process model for value management and reporting module in accordance with an embodiment of the present invention. The relationship management module|value management reporting module (VMR) 120 is configured to establish and prioritize a plurality of sourcing objectives, identify a plurality of key value drivers with respect to the plurality of sourcing objectives, establish financial and non-financial key performance indicators, govern the plurality of key value drivers and perform a value driver analysis and generate a value management report with a feedback loop mechanism as shown in FIG. 6. In an embodiment, the relationship management module|value management reporting module (VMR) 120 is configured to enhance service quality improvements of services delivered by the vendor organization 104 and financial performance measures utilizing the value driver analysis. The financial performance measures include monthly spend and cost reduction in vendor cost and non-financial performance measures including customer satisfaction management, innovation management, service delivery improvements and service quality improvements. The relationship management module|value management reporting module (VMR) 120 enhances the governance process and effective practices by embedding the financial performance measures, service delivery and service quality improvements in the form of the value driver analysis that result in enhanced customer satisfaction, improved operational outcomes, optimized to deliver against the sourcing business objectives set in the business case and to capture incremental value on an ongoing basis over the life of the deal.

The relationship management module|value management reporting module (VMR) 120 of SMG|value tracker creates value management review plan and link to IT service tower project 300 as shown in blocks 600 and 602 respectively. The customer region, country, BU are assigned and MSA, SOW and contract documents are mapped to the value management review plan as indicated at block 604. Then, the value management review plan is executed and appropriate valued drivers are captured as shown in block 606. As indicated at block 608, value driver analysis and transaction updates with issue|risk|cost parameters are carried out. Then, the value driver analysis and variance reports are generated as shown in block 610. The review on VMR action plan and review closure is performed as indicated at block 612. Finally, the feedback loop, continual improvements and action plan (NCR, RCA and FBL) are performed as indicated at block 614.

Figure 7:
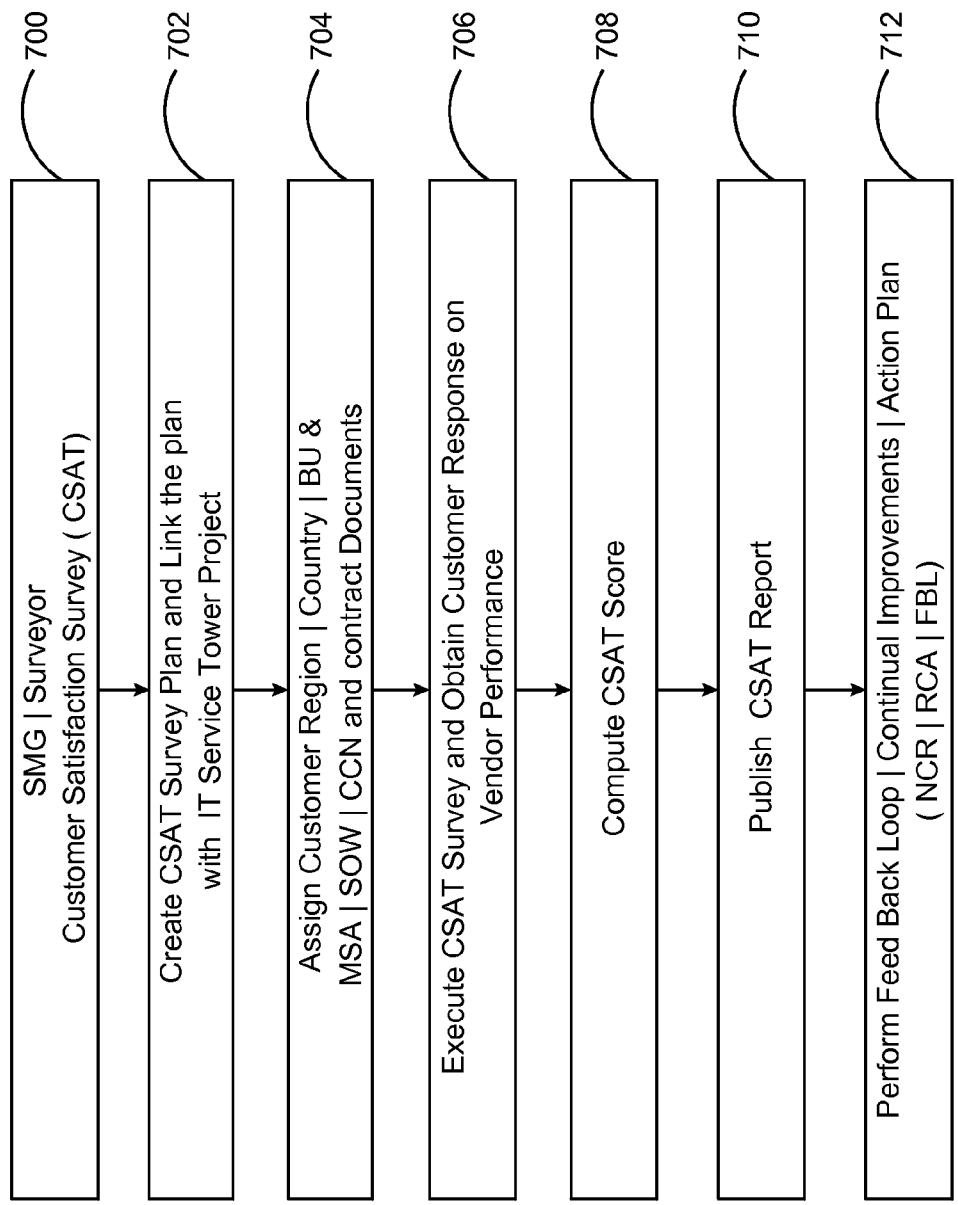
FIG. 7 illustrates a schematic diagram of an exemplary operational process model for customer satisfaction management module in accordance with an embodiment of the present invention.

FIG. 7 illustrates a schematic diagram of an exemplary operational process model for customer satisfaction management module in accordance with an embodiment of the present invention. The performance management module-|customer satisfaction survey (CSAT) 122 is configured to evaluate vendor performance cut across a plurality of key stakeholders in various divisions like finance, legal, procurement, sourcing, IT, business, sales, CPO, CMO, PMO and VMO. The evaluation of vendor performance is performed by executing customer satisfaction survey with respect to sourcing strategy, management and governance aspects for underlying sourcing initiatives, programs and associated vendor organization 104 as shown in FIG. 7.

The performance management module|customer satisfaction survey (CSAT) 122 creates CSAT survey plan and link the plan with IT service tower project 300 as indicated at blocks 700 and 702. Then customer region|country|BU|M-SA|SOW|CCN and contract documents are assigned as shown in block 704. Then, the CSAT survey is executed and customer response on vendor performance is obtained as shown in block 706. The CSAT score is computed and CSAT report is published as shown in blocks 708 and 710 respectively. Finally, the feedback loop, continual improvements and action plan (NCR, RCA and FBL) are performed as indicated at block 712.

In one embodiment, the performance management module|customer satisfaction management module (CSAT) 122 includes a customer satisfaction management module that analyzes the customer satisfaction survey in key process areas of sourcing management and governance like finance, legal, procurement, sourcing, IT, business, sales, CPO, CMO, PMO, VMO, contract management, financial management, service delivery management, performance management relationship management including customer complaints, suggestions, communications, contract and governance issues and disputes, service delivery management, vendor governance, regulatory and IT security compliance on a periodical basis for the core IT Sourcing initiatives or programs. The customer satisfaction management module executes a customer satisfaction survey on a periodical basis and generates a customer satisfaction management report for highlighting issues, strengths, weaknesses, areas of improvement of vendor performance across a particular customer or business units, or for a specific IT sourcing initiative or program covering various region, country, business unit or division or product if required. This allows vendor organization 104 and customer organization 102 to create relationships that results in enhanced customer satisfaction, improved operational, tactical and strategic outcomes, optimized to deliver against the sourcing business objectives on an ongoing basis over the life of the deal.

Figure 8:
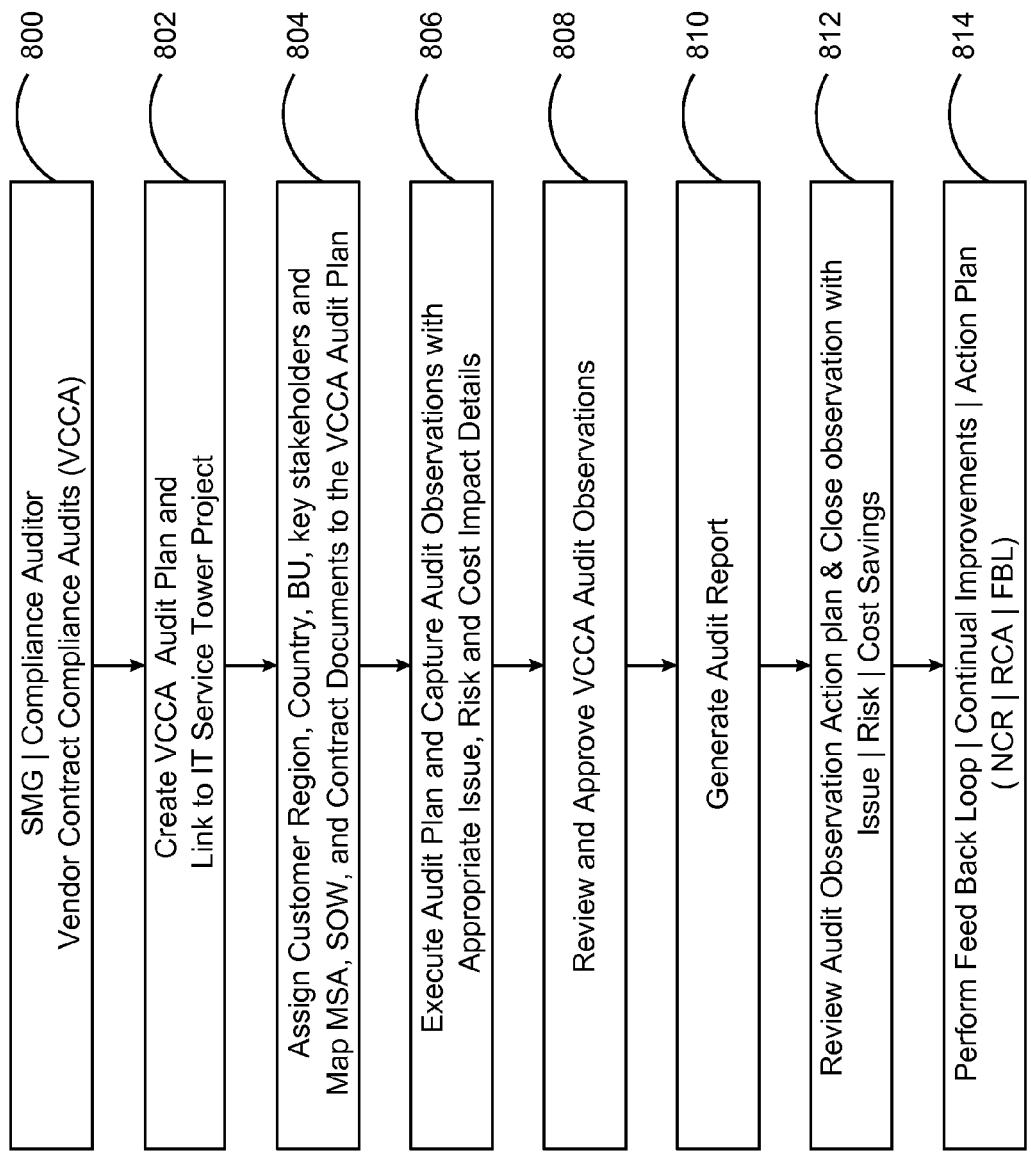
FIG. 8 illustrates a schematic diagram of an exemplary operational process model for vendor contract compliance management module in accordance with an embodiment of the present invention.

FIG. 8 illustrates a schematic diagram of an exemplary operational process model for vendor contract compliance management module in accordance with an embodiment of the present invention. The vendor contract compliance audit (VCCA) management module 124 is configured to ensure vendor contract compliance through contract compliance audits by monitoring the compliance, risk and vendor governance as shown in FIG. 8. The vendor contract compliance audit (VCCA) management module 124 enables the vendor organization 104 to control costs, drive service excellence and mitigate risks to gain increased value from the vendors throughout the sourcing life cycle. The vendor contract compliance audit (VCCA) management module 124 helps the customer organization 102 to evaluate the vendor compliance, retain the right vendors, categorize vendors to ensure the right contract, terms and conditions contract clauses, metrics and relationship, determine the vendor compliance, mitigate the identifies issues and risks and establish a compliance action plan. This enables the customer organization 102 to optimally develop, manage and control vendor contracts, supplier relationships, vendor compliance and performance for the efficient delivery of contracted products and services, which in turn enables a customer to meet the business objectives, minimize potential business disruption, avoid any regulatory impacts, business service impact and delivery failure, and ensure more-sustainable multisourcing, while driving the most value from the vendors throughout the contract lifecycle.

The vendor contract compliance audit (VCCA) management module 124 creates VCCA audit plan and links to IT service tower project 300 as indicated at blocks 800 and 802 respectively. Then, the customer region|country|BU, key stakeholders are assigned and MSA, SOW and contract documents are mapped to the VCCA audit plan as shown in block 804. As indicated at block 806, the audit plan is executed and audit observations with appropriate issue, risk and cost impact details is captured. The VCCA audit observations are reviewed and approved and audit report is generated as shown in block 808 and 810 respectively. The audit observation action plan is reviewed and observation with issue|risk|cost savings is closed as indicated at block 812. Finally, the feedback loop, continual improvements and action plan (NCR, RCA and FBL) are performed as indicated at block 814.

The vendor contract compliance audit (VCCA) management module 124 identifies one or more stakeholders in the vendor organization, assess the identified stakeholders, identify one or more risks and/or identify vendor contract compliance audit focus areas between the identified stakeholders, and analyze the identified risk|vendor contract compliance audit focus areas, prioritize and review the risk|vendor contract compliance audit focus areas, define strategies for managing the identified stakeholders based on the identified risks vendor contract compliance audit focus areas and submit a vendor contract compliance audit report with a feedback loop. The vendor contract compliance audit report includes executive summary, audit methodology, findings and recommendations to customer organizations.

Figure 9:
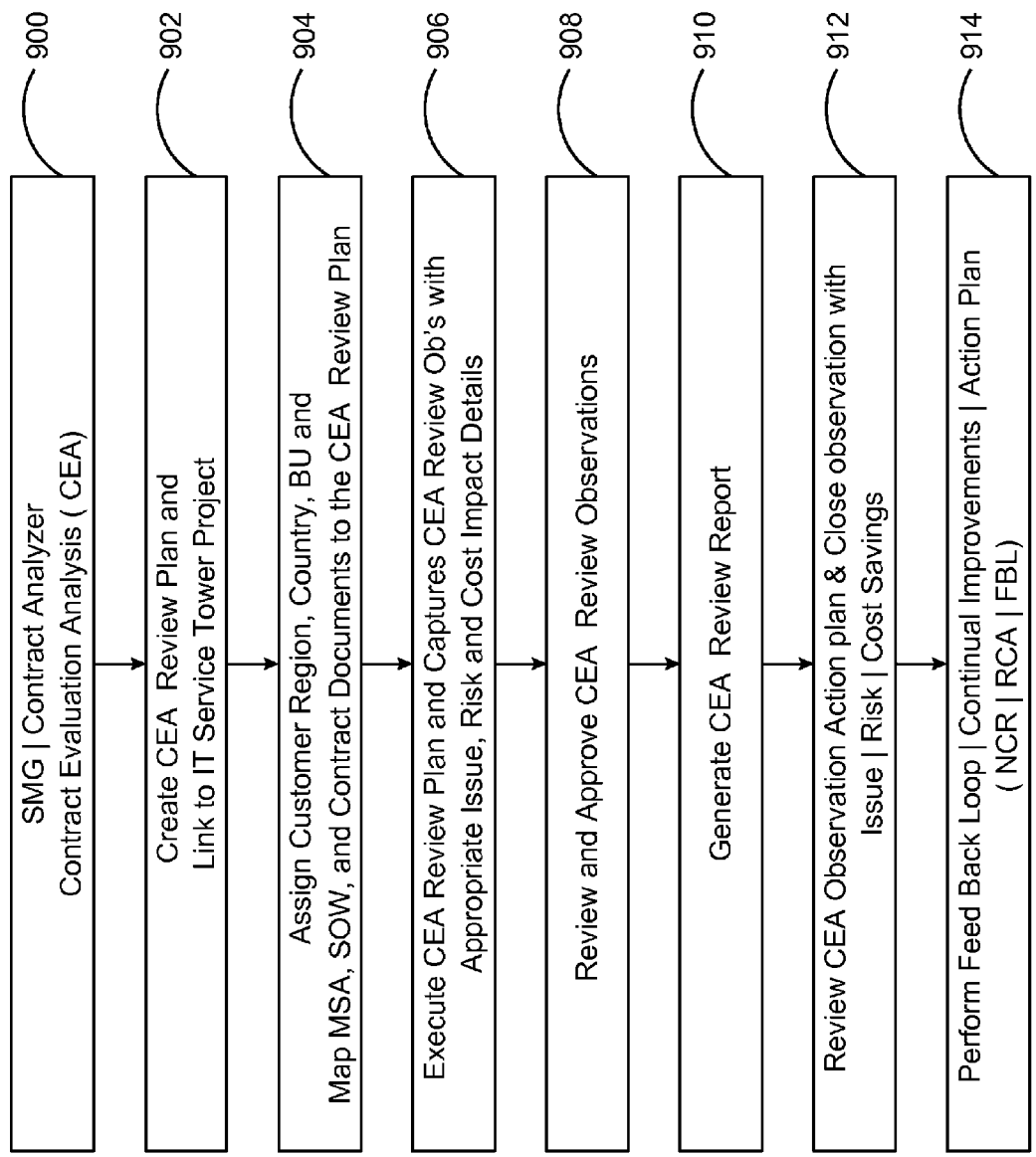
FIG. 9 illustrates a schematic diagram of an exemplary operational process model for contract evaluation and analysis management module in accordance with an embodiment of the present invention.

FIG. 9 illustrates a schematic diagram of an exemplary operational process model for contract evaluation and analysis management module in accordance with an embodiment of the present invention. The contract evaluation analysis (CEA) module 126 is configured to manage customer, vendor by providing a contract evaluation analysis of the customer, vendor, sourcing management and governance, contractual, regulatory aspects and generate a contract evaluation report with a feedback loop mechanism as shown in FIG. 9. The contract evaluation analysis (CEA) module 126 recommends appropriate action plan, the best practices, lessons learned and prescriptive analysis to avoid issues and associated risks with respect to the sourcing initiative or program with the underlying vendor. The prescriptive analysis also provides a diagnostics on cost management parameters aspect to avoid any commercial, legal, regulatory and supply risk stand point. This facilitates an effective feedback loop mechanism for continual improvements on the contract management policies, processes and procedures for the client organization and provides a mechanism for creating a system of record.

The contract evaluation analysis (CEA) module 126 creates CEA review plan and link to IT service tower project 300 as indicated at blocks 900 and 902 respectively. Then, the customer region|country|BU, key stakeholders and map MSA, SOW and contract documents are assigned to the CEA review plan as shown in block 904. Then, CEA review plan is executed and CEA review obligations with appropriate issue, risk and cost impact details is captured as indicated at block 906. The CEA review observations are reviewed and approved as shown in block 908. As indicated at block 910, the CEA review report is generated. The CEA observation action plan is reviewed and observation with issue|risk|cost savings is closed as shown in block 912. Finally, the feedback loop, continual improvements and action plan (NCR, RCA and FBL) are performed as indicated at block 914.

Figure 10:
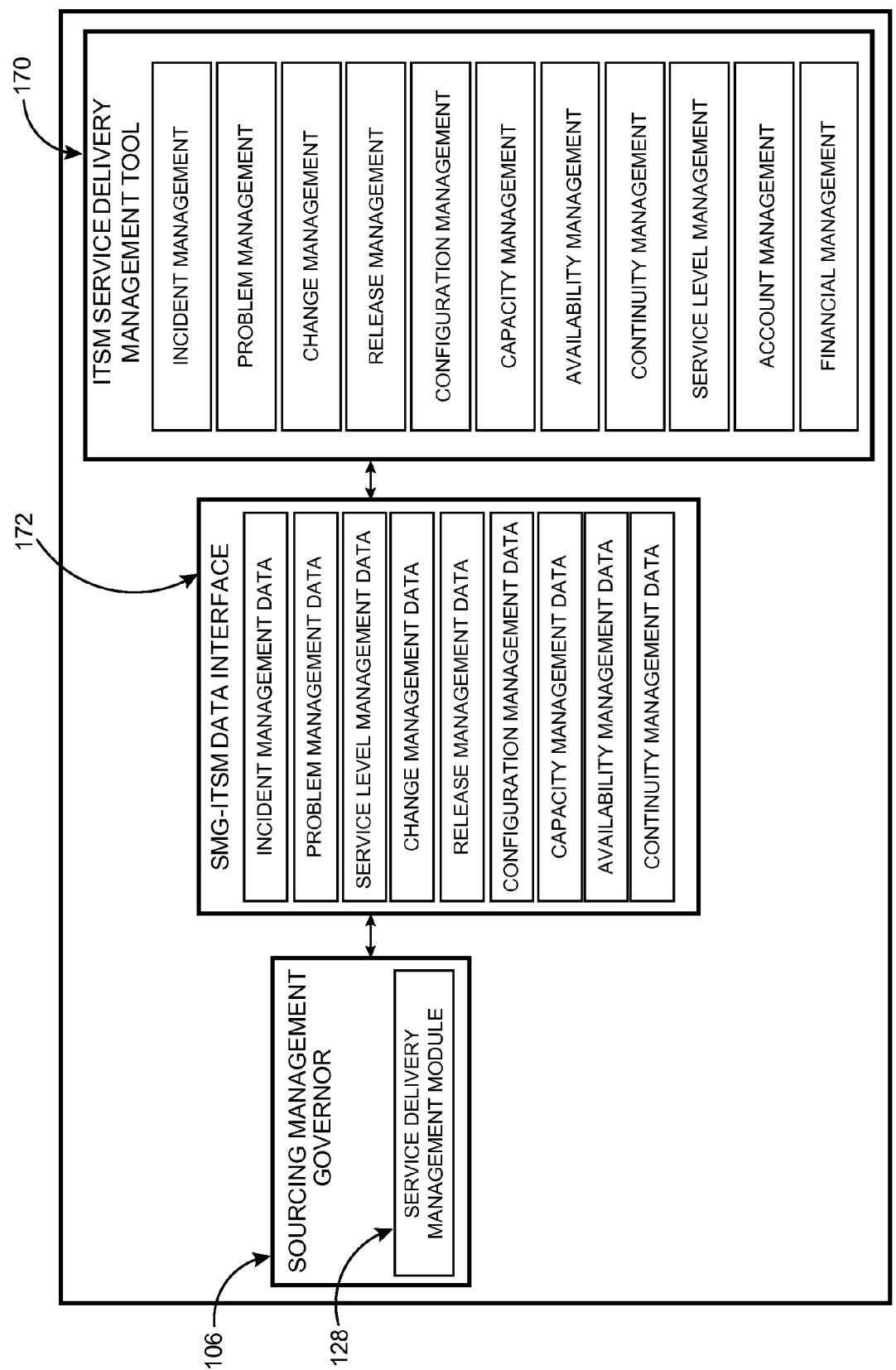
FIG. 10 illustrates a schematic diagram of an exemplary operational process model for service delivery management module in accordance with an embodiment of the present invention.

FIG. 10 illustrates a schematic diagram of an exemplary operational process model for service delivery management module in accordance with an embodiment of the present invention. The service delivery management (SDM) module 128 is configured to track and report the vendor performance data of a plurality of service delivery functions to meet service support requirements of the customer organization 102 for the respective IT Sourcing initiative or program. The service delivery management (SDM) module 128 handles all vendor performance data and consists of processes involved in governing and reporting the vendor service delivery performance data. There are different set of ITSM tool 170 or solutions being used by the client and vendor organization for planning and delivering IT services, service support and maintenance. The service delivery management tool 170 (ITSM) handles all issues and tasks involved in planning, implementing, and improving the IT service management processes. The service delivery management (SDM) module 128 of this invention is configured to obtain performance data through a data interface 172 from the existing ITSM 170 application as shown in FIG. 10.

In one embodiment, the service delivery management (SDM) module 128 configured to manage and report the plurality of service delivery performance data through an data interface with core ITSM modules such as service desk, configuration management, change management, release management, capacity management, financial management for IT services, service level management, availability management, problem management; incident management and IT service continuity management as shown in FIG. 10.

In one embodiment, the sourcing management governor (SMG) 106 includes a reference data management module 134 configured to manage the plurality of meta data|reference information pertaining to sourcing management and governance aspects between the vendor organization 104 and the customer organization 102.

The sourcing lifecycle comprises a plurality of phases including a managing phase, a monitoring phase, a tracking phase, a reporting phase and a feedback phase. The sourcing management governor (SMG) 106 tracks, monitors, and manages customers, suppliers, contracts, contract documents, IT service tower projects (sourcing initiatives, programs), contractual obligations, financial, commercial, budget and spend data, service delivery, vendor performance, governance, compliance, risk performance and spend data with the vendor organization 104 and enables effective governance throughout the sourcing lifecycle.

During the operation level agreement (OLA) governance reporting, IT spend visibility management and reporting, the sourcing management governor (SMG) 106 manages the plurality of customer information, supplier information, IT sourcing initiatives, Global Services Agreements (GSA), the Master Service Agreements (MSA), contractual obligations, budget and spend data, performance cut across tactical, strategic and obligations and service delivery data, identifies potential risks, issues and disputes, cost management issues to achieve compliance, to meet the expected outcomes and to minimize value leakages. During the monitoring phase, the sourcing management governor (SMG) 106 monitors the plurality of contractual obligations across the contracts established with the vendor organization 104, perform the plurality of value driver analysis, perform the plurality of vendor spend compliance and customer satisfaction. During the tracking phase, the sourcing management governor (SMG) 106 tracks contract performance, compliance and risks, evaluate supplier compliance, performance and risks. During the reporting phase, the sourcing management governor (SMG) 106 provides periodical alerts and strategic governance dashboard and reports to enable an effective governance process across sourcing and vendor management value chain cut across different key process areas (KPA). During the feedback phase, the sourcing management governor (SMG) 106 provides an effective feedback loop and continual improvement mechanism to mature and optimize the governance process and enhance the supplier relationship.

The customer organization 102 establishes the obligation tracking and reporting module in line with the current policies, processes and procedures by appropriately integrating the plurality of key stakeholders from the vendor organization 104, the customer organization 102, the contract management organization (CMO) 108, a program management office (PMO) 110, a sourcing management|central procurement organization 112, and a sourcing vendor management organization (SVM|VMO) 114.

Figure 11:
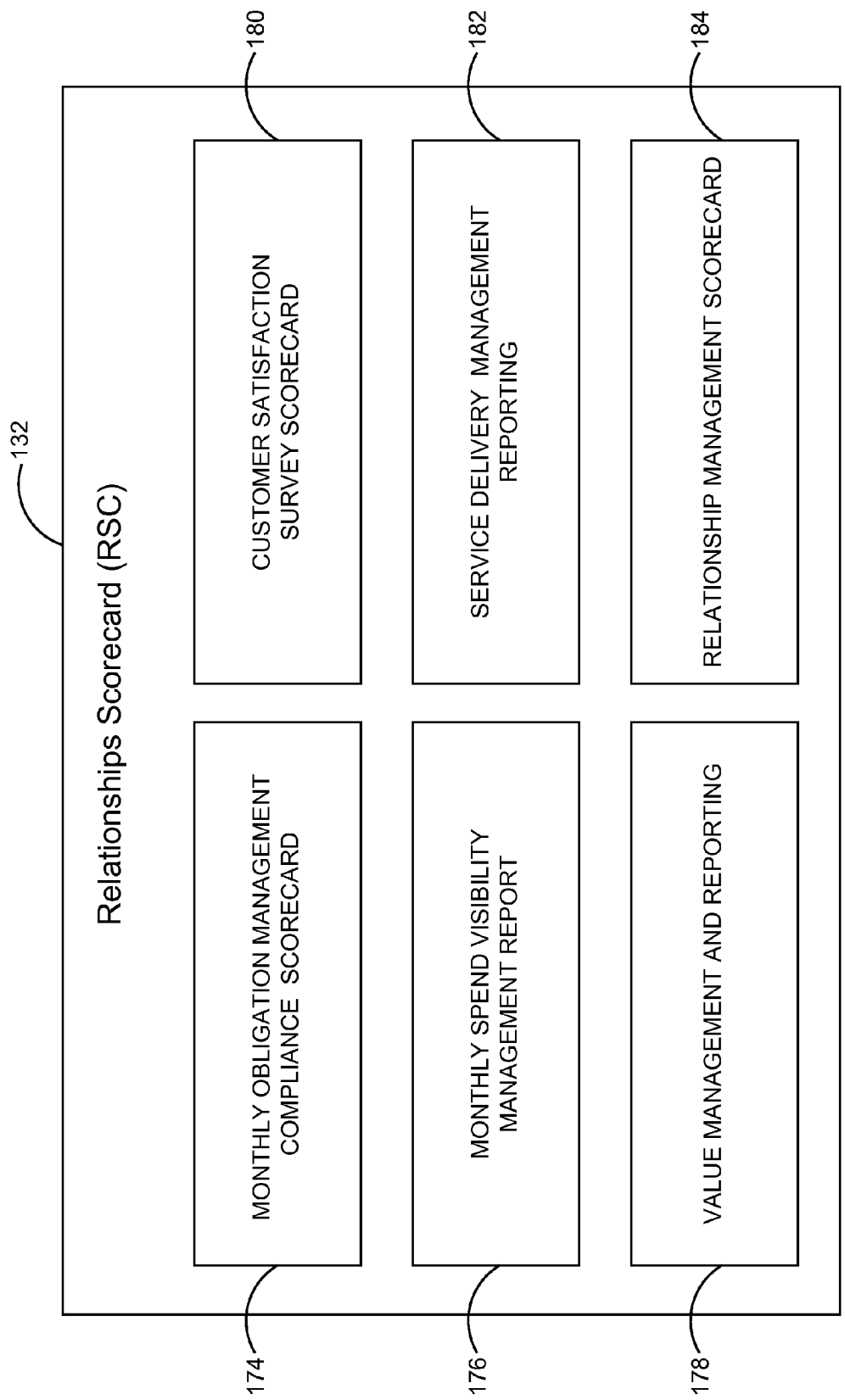
FIG. 11 illustrates a schematic diagram of an exemplary operational process model for performance management module utilizing relationship scorecards in accordance with an embodiment of the present invention.

A schematic diagram of an exemplary operational process model for performance management module utilizing relationships scorecard 132 in accordance with an embodiment of the present invention is illustrated in FIG. 11. The relationships scorecard (RSC) 132 provides the final output on the dashboard. The RSC includes monthly obligation management compliance scorecard, the monthly spend visibility management report scorecard, value management and reporting scorecard, the customer satisfaction survey scorecard, the service delivery management scorecard and relationships management scorecard.

As shown in block 174, the monthly obligation management compliance scorecard further includes obligation compliance score which shows deliverable & milestone status, obligation risk score which lists issue|risk|cost management|register and obligation performance score which includes service delivery|KPI compliance metrics|billable items|cost management|issues. The monthly spend visibility management report scorecard as indicated at block 176 further includes budget data including budget data region-|country|business unit, actual spend data including invoice data, spend data including spend category & categories of charges, variance analysis including variance %|variance value, spend visibility including cost savings|cost reduction and cost management including cost recovery|cost avoidance|charge backs. The value management and reporting scorecard as shown in block 178 further includes financial value including actual and impacted cost savings|KPI %, no. & value|billable amount, operational value including service delivery|service quality|process efficiency and strategic value including customer satisfaction contract renewal|continual improvement plans.

The customer satisfaction survey scorecard indicated at block 180 includes contract change management including issue dispute resolution management|strategic alignment communications management, relationship management including sourcing governance relationship health index, financial & commercial management including spend analysis|pricing billing & payments, SVM governance|risk|CCM management including audits|IT security, service quality & service daily management including innovation management and performance management including SLA management|category management|value management. The service delivery management reporting at block 182 further includes service delivery on time, OLA management, SLA management, innovation management, service quality management and value realization. The relationship management scorecard as shown in block 184 includes issue risks|cost implications|contract management changes, mitigation of issues & risks, best practices for improvements and identifies strength, weakness, opportunities and threats.

In one embodiment, the vendor contract compliance audit report is submitted with a vendor contract compliance roadmap with recommendations. Based on the vendor contract compliance report, the customer organization 102 monitors performance trends and changes in risk drivers to enhance predictability.

According to one exemplary embodiment of the invention, the vendor organization 104 and the customer organization 102 is connected to the sourcing management governor (SMG) 106 via a communication network. The communication network can be selected from the Internet, Intranet, and any other communication networks. In a preferred embodiment, the communication network is internet. The vendor organization 104 and the customer organization 102 can access the sourcing management governor (SMG) 106 utilizing at least one or more electronic device such as: computer, Laptop, PDA or hand-held electronic device.

In one embodiment, a non-transitory computer-readable medium comprises computer-executable instructions stored therein for causing a computer to implement a program executable on an integrated solution framework for outsourcing management and governance for multi geography, multi sourcing and multi vendor environments. The non-transitory computer readable storage medium comprises a USB memory, CD-ROM, to flexible disc, DVD or a flash memory. In one embodiment, a non-transitory computer-readable medium comprises computer-executable instructions stored therein for causing mobility solutions to implement a program executable on an integrated solution framework for outsourcing management and governance for multi geography, multi sourcing and multi vendor environments.

The foregoing description of the preferred embodiment of the present invention has been presented for the purpose of illustration and description. It is not intended to be exhaustive or to limit the invention to the precise form disclosed. Many modifications and variations are possible in light of the above teachings. For example, the solution framework may include additional modules for outsourcing management and governance for multi geography, multi sourcing and multi vendor environments throughout a sourcing lifecycle. It is intended that the scope of the present invention not be limited by this detailed description, but by the claims and the equivalents to the claims appended hereto.

GLOSSARY OF TERMS

Client Organization: The entity that is negotiating with or designating multiple service providers to supply specific or a combination of IT services.
Service Provider: One of multiple entities that are envisaged to provide an IT service.
CPO: Central Procurement Organization
CMO: Contract Management Organization
PMO: Program Management Organization
SVM: Sourcing and Vendor Management
VMO: Vendor Management Organization
LOI: Letter of Intent
MSA: Master Service Agreement (MSA)
GSA: Global Services Agreement (GSA)
SOW: Statement of Work (SOW)
CCN: Contract Change Notes
CR: Change Requests
CCMB: Contract Change Management Board
OB MGT: Obligation Management
CCM: Contract Compliance Management
VCCA: Vendor Contract Compliance Audit
CEA: Contract Evaluation Analysis
VMR: Value Management and Reporting
SMR: Spend Visibility Management and Reporting
CSAT: Customer Satisfaction Management
BPO: Business Process Outsourcing
GRC: Governance, Risk and Compliance
ITSM: IT Service Management
ERM: Enterprise Risk Management
SMG: Sourcing Management Governor
NCR: Non-Compliance Reporting
RCA: Root Cause Analysis
FBL: Feed Back Loop
KPA: Key Process Area.
KPI: Key Performance Indicator.
OLA: Operating Level Agreement
Process: A defined set of activities and procedures to enable an organization to handle the specific set of activities.
Service: A defined set of activities and tasks to enable an organization to handle functions associated with normal business activities.
IT Services: A service or process that is to be supplied by a service provider to the client or buyer organization.
Performance Level: A measurable level of how a process or service is performing.
SLA: Service level agreement; a definition of the terms that a service provider is to meet in order to provide a specific service.
Service Delivery Functions: A process or service enabling an organization to carry out event driven and business as usual functions,
Task List: A defined course of action for carrying out a sub-activity of a service.
Procedure: A defined course of action for carrying out a sub-activity of a process.
Process activity: A course of action required to implement a process.
Service activity: A course of action required to provide a service.
Sub-activity: A subset of a process activity or a service activity resulting in either procedures or task lists.
Current service performance level: A measurement of the current level of performance by a service provider for a particular technology based service.
Strategic Level: A level of governance in an organization that is responsible for the operational level and tactical level of governance and is responsible for overseeing and defining a long term action plan for the organization.
Tactical Level: A level of governance in an organization that is responsible for the operational level of governance and is responsible for enabling the organization to achieve a specific object or resolve a specific problem.
Operational Level: A level of governance in an organization that is responsible for governing processes or services used to allow the organization to operate effectively.
Target service performance level: A negotiated level of performance that an organization wishes a service provider to achieve for a particular technology based service.
Responsibility matrix: A solution framework of rows and columns for identifying which service providers are responsible for providing services to an organization.
Interaction Charter: A set of operating principles defined at a tactical level including the rules of interaction between service providers and the organization.
Level of Governance: An indication of the level in an organization that is responsible for governing a process, service or role.

I claim:
1. An integrated solution framework for outsourcing management and governance for multi geography, multi sourcing and multi vendor environments, comprising:
a sourcing management governor for managing, monitoring, tracking and reporting effective governance between a customer organization and a vendor organization throughout a sourcing lifecycle, the sourcing management governor comprising:
a contract compliance management module executed by a computer configured to:
manage and track vendor contracts including a plurality of contractual obligations between the customer organization and the vendor organization for the various IT services;
ensure the vendors are adhering to the plurality of contractual obligations and the objectives of outsourcing are achieved as planned;
monitor and manage changes in the plurality of contractual obligations with respect to changing business needs;
focus on performance measurement and contractual requirement definitions which establish a contract compliance traceability matrix including changes in the plurality of contractual obligations, the contract compliance traceability matrix being configured to ensure that the contractual baseline is established, tracked and reported with historical changes;

track, monitor and report both client and service provider obligations on a month on month basis and generate obligation management reports;

facilitate a feedback loop mechanism for carrying out root cause analysis for the non compliance issues, risks and disputes and providing a corrective action plan for continual improvements; and apply a contract obligation systemization operational process module algorithm comprising a) extracting contractual obligations from contract documents in the contract repository, the contract documents having varying complexity, vendors, service delivery location, region and country, marking each with identification and date information and compiling them into a contractual obligation register b) uploading the obligation register to the sourcing management governor and integrating it with the IT service tower project, and updating the obligation register with reference data and Key Performance Indicators data, c) reconciling the uploaded and updated obligation register and obtaining approval for obligations, d) running an obligation scheduler to set obligation due dates, e) performing a transactions update with recovery information, f) applying record locking and generating a monthly obligation compliance scorecard, contract change management board and traceability reports, g) setting record selection for following month obligation compliance management, and h) performing a feedback loop continual improvement and action plan by establishing obligation management report using changes in contractual obligations that list details of contractual obligations with status, risk, and mitigation information;

a financial management module executed by a computer configured to:

govern the spend compliance to the spend data transaction records and segments of transactions with predetermined high savings opportunities defined in the Master Service Agreement|Global Service Agreement|Statement of Work contracts and business case;

receive a set of spend transaction records containing one or more spend attributes by capturing, managing and monitoring IT spend data with respect to various IT services, sourcing initiatives or sourcing programs;

provide a spend visibility analysis between an estimated budget data and the spend data;

generate analysis, variance and spend compliance reports related to each IT sourcing initiatives or sourcing programs for each vendor;

facilitate a feedback loop mechanism for carrying out root cause analysis for the non compliance spend, issues, risks and disputes and providing a corrective action plan for continual improvements;

trigger opportunities for a spend compliance and cost savings initiative to move towards an optimal vendor category management;

provide an insight on supplier spend, spend analysis provides significantly higher visibility into key suppliers, supply sources, maverick spend, contractual and spend compliance by IT spend visibility management and reporting module; and apply an invoice-purchase order systemization operational process algorithm, comprising: a) extracting and uploading purchase order data to the sourcing management governor, b) performing purchase order reconciliation, c) establishing a relationship between each purchase order and a region and/or country, d) extracting and uploading invoice data to the sourcing management governor, e) establishing relationships between each uploaded invoice and a region and/or country, f) reconciling the invoices to the purchase orders and posting the invoices to an invoice master, g) establishing a relationship between the invoices and spend management Key Performance Indicators, and h) performing spend visibility analysis and generating reports;

a value management module executed by a computer configured to:

establish and prioritize a plurality of value creating sourcing objectives for each sourcing initiative or sourcing program;

identify and prioritize a plurality of key value drivers with respect to the plurality of sourcing objectives;

establish financial and non-financial key performance indicators;

govern the plurality of key value drivers and perform a value driver analysis against the IT services or each IT sourcing initiative;

generate a value management, variance and trend analysis reports with a feedback loop;

facilitate a feedback loop mechanism for carrying out root cause analysis for the non compliance issues, risks and disputes and providing a corrective action plan for continual improvements; and apply a value management systemization operational process algorithm, comprising: a) creating a value management review plan and linking the value management review plan to the IT service tower project, b) assigning a customer region and country and mapping contract documents to the value management review plan, c) executing the value management review plan and capturing appropriate value drivers, d) carrying out value driver analysis and generating variance reports, e) performing a review of value management reporting action plan and review closure, and f) performing a feedback loop continual improvements and action plan;

a performance management module executed by a computer configured to:

evaluate vendor performance cut across a plurality of key stakeholders;

establish and prioritize a plurality of value creating sourcing objectives for each sourcing initiative or sourcing program;

identify and prioritize a plurality of key value drivers with respect to the plurality of sourcing objectives;

establish financial and non-financial key performance indicators;

govern the plurality of key value drivers and perform a value driver analysis against the IT services or each IT sourcing initiative; and facilitate a feedback loop mechanism for carrying out root cause analysis for the non compliance issues, risks and disputes and providing a corrective action plan for continual improvements;
select at least one customer satisfaction model; and
apply the at least one customer satisfaction model to the combination of extracted unstructured and structured features to produce a customer satisfaction score;
a vendor contract compliance audit management module executed by a computer configured to:
perform an audit for a contract between a buyer and a supplier for the respective IT sourcing initiative or program;
a contract evaluation analysis module executed by a computer configured to:
perform a contract evaluation and review analysis for a contract between a buyer and a supplier for the respective IT sourcing initiative or program;
manage customer, vendor and regulatory, sourcing management and governance aspects;
provide a contract evaluation analysis of the customer, vendor and regulatory, sourcing management and governance aspects; and
generate a contract evaluation report with a feedback loop;
a service delivery management module configured to:
manage a plurality of service delivery functions to meet support requirements of the customer; and
obtain the service delivery performing data from the IT Service Management tool between a buyer and a supplier for the respective IT sourcing initiative or program; and
a sourcing governance management module executed by a computer configured to:
enable governance of a plurality of key process areas (KPA) among the plurality of key stakeholders utilizing management dashboards and scorecards;
whereby the sourcing management governor enhances and optimizes relationship between the customer organization and the vendor organization utilizing the contract compliance management module, the financial management module, the relationship management module, the vendor management module, the contract evaluation analysis module, the performance management module, the sourcing governance management module, the service delivery management module regardless of the scope objectives, contract, IT sourcing program, vendor, service delivery location and region, country and business units throughout the sourcing lifecycle.

2. The integrated governance solution framework of claim 1 wherein the obligation management reports includes compliance, non compliance, issue, risk, cost management reports.

3. The integrated governance solution framework of claim 1 wherein the contract compliance management and reporting module, the extracted plurality of contractual obligations and associated reference data is uploaded and configured through an obligation register into an obligation governor.

4. The integrated governance solution framework of claim 1 wherein the spend data includes purchase order invoice, categories of charges, spend allocation category and cost savings.

5. The integrated governance solution framework of claim 1 wherein the spend visibility management report includes value leakages, cost savings and appropriate risk and effective control measures to govern the spend data.

6. The integrated governance solution framework of claim 1 wherein the spend visibility management report enables financial, budget, spend control and compliance with respect to the vendor organization for the respective IT sourcing initiative or program.

7. The integrated governance solution framework of claim 1 enables an enhanced visibility, transparency on organization procurement, sourcing and spend practices.

8. The integrated governance solution framework of claim 1 wherein the value management and reporting module is configured to achieve and beyond the sourcing business objectives and more effectively manage its vendor relationship to those objectives by identifying appropriate value drivers for the respective sourcing initiative or program.

9. The integrated governance solution framework of claim 1 wherein the value management and reporting module is configured to define and enhance performance and service quality improvements of services delivered by the vendor organization covering financial, non financial performance measures, operational and strategic value drivers for the associated strategic initiative or sourcing program.

10. The integrated governance solution framework of claim 1 is further configured to generate the value management dashboard, analysis and variance reports against the supplier.

11. The integrated governance solution framework of claim 1 wherein the evaluation of vendor performance is performed by executing customer satisfaction survey focusing on key process areas of sourcing and governance aspects for the underlying sourcing initiative and associated vendor organizations.

12. The integrated governance solution framework of claim 1 wherein generating the customer satisfaction score comprises steps of:
selecting at least one customer satisfaction model; and
applying the at least one customer satisfaction model to said combination of extracted unstructured and structured features to produce a customer satisfaction score.

13. The integrated governance solution framework of claim 1 wherein performing an audit for a contract between a buyer and a supplier comprises the steps of:
defining a plurality of scope and objectives of the compliance audit;
providing areas for improvement, resolution, action plan with appropriate root cause analysis and cost management savings and recovery opportunities;
preparing a preliminary findings and executive summary report on said audit findings;
aligning said audit findings with stakeholders of both customer and supplier;
preparing and sharing a vendor contract compliance report based on the audit findings;
evaluating supplier performance, governance, risk and compliance against said contract;
evaluating a current health of the contract under purview of audit;
determining potential opportunities for improvement related to the contract;
providing optimal and sustained cost savings for the client; and
facilitating an audit resolution and recovery with the supplier based on the audit report through feedback loop mechanism.

14. The integrated governance solution framework of claim 1 wherein the vendor contract compliance management module further configured to carry out the analysis on audit findings, review the contract, contract terms and conditions, associated contract documents and interact with key stakeholders of both buyer and supplier.

15. The integrated governance solution framework of claim 1 wherein performing a contract evaluation and review analysis comprises the steps of:
defining a plurality of scope and objectives of the contract evaluation and review, providing areas for improvement, resolution, action plan with appropriate root cause analysis and cost management savings and recovery opportunities; and
providing a review analysis of core contractual terms and conditions (T&C) of the contract, identify the anomalies revolving around T&Cs and providing an refined approach with appropriate recommendations by adopting industry best practices and lessons learned based on the past experience with service provider contracts.

16. The integrated governance solution framework of claim 15 wherein providing a review analysis of core contractual terms and conditions (T&C) of the contract comprises the steps of:
comparing existing contract performance against today's market and industry standards;
identifying opportunities for contract improvement;
providing a platform for discussion between the buyer and the service provider;
identifying tangible actions to create a leading-edge outsourcing contract with respect to changing market, regulatory, environmental, technology and business needs;
identifying supply, vendor, compliance, technology, sourcing risk information and linking to strategic decision making by embedding risk management practices and responsibilities within client's Sourcing and Vendor Management strategy and operations;
proactively identifying current and emerging risks and driving risk mitigation activities;
allowing to identify appropriate terms and conditions which are relevant to the nature of IT services or sourcing initiative with respect to client's business unit and changing business needs;
providing a contract evaluation analysis based on a balanced view of the contracts covering both client and service provider's alleviating the issues and risks pertaining to contract terms and conditions to have a sustainable long term relationships with the service providers;
preparing preliminary findings and contract evaluation analysis report based on the review findings;
aligning said contract evaluation review findings with stakeholders of the customer;
preparing and sharing a contract evaluation analysis report based on the review findings;
evaluating supplier performance, governance, risk and compliance against said contract;
evaluating a current health of the contract under purview of review;
determining potential opportunities for improvement related to the contract;
providing optimal and sustainable cost savings for the client; and
facilitating a continual improvement opportunities, review findings recommended action plan based on the review report through feedback loop mechanism.

17. The integrated governance solution framework of claim 1 wherein the sourcing management governor includes a communication management module configured to manage communication of information between the customer organization and the vendor organization during the sourcing lifecycle.

18. The integrated governance solution framework of claim 1 wherein the plurality of key process areas includes obligation management, contract compliance management, spend visibility management, value management reporting, vendor contract compliance audits, contract evaluation analysis, contract change management, vendor performance management, customer satisfaction management, issue and risk management, audit tracking, cost leakages and streamlined, automated process and governance mechanism.

19. The integrated governance solution framework of claim 1 wherein the sourcing management governor provides strategic insights about contract terms, financial performance, commercial management, service delivery, contractual obligations, compliance, cost, risk and the relationship with the external or extended partners.

20. The integrated governance solution framework of claim 1 wherein the sourcing lifecycle comprises a plurality of phases including a managing phase, a monitoring phase, a tracking phase, a reporting phase and a feedback phase.

21. The integrated governance solution framework of claim 1, wherein the spend visibility analysis allows a customer to achieve sustainable cost savings by triggering appropriate cost savings initiatives and minimizing the value leakages.

22. The integrated governance solution framework of claim 1, wherein the financial module enables contractual and spend compliance analysis of the supplier.

23. A non-transitory computer-readable medium comprising computer-executable instructions stored therein for causing a computer to implement an integrated solution framework for outsourcing management and governance for multi geography, multi sourcing and multi vendor environments, the integrated solution framework comprising:
a sourcing management governor for managing, monitoring, tracking and reporting effective governance between a customer organization and a vendor organization throughout a sourcing lifecycle, the sourcing management governor comprising:
a contract compliance management module executed by a computer configured to:
track a plurality of contractual obligations between the customer organization and the vendor organization;
monitor and manage changes in the plurality of contractual obligations with respect to changing business needs;
establish an obligation traceability matrix including changes in the plurality of contractual obligations;
generate an obligation management report with a feedback loop; and
apply a contract obligation systemization operational process module algorithm comprising a) extracting contractual obligations from contract documents in the contract repository, the contract documents having varying complexity, vendors, service delivery location, region and country, marking each with identification and date information and compiling them into a contractual obligation register b) uploading the obligation register to the sourcing management governor and integrating it with the IT service tower project, and updating the obligation register with reference data and Key Performance Indicators data, c) reconciling the uploaded and updated obligation register and obtaining approval for obligations, d) running an obligation scheduler to set obligation due dates, e) performing a transactions update with recovery information, f) applying record locking and generating a monthly obligation compliance scorecard, contract change management board and traceability reports, g) setting record selection for following month obligation compliance management, and h) performing a feedback loop continual improvement and action plan by establishing obligation management report using changes in contractual obligations that list details of contractual obligations with status, risk, and mitigation information;

a financial management module executed by a computer configured to:
        capture, manage and monitor a spend data with respect to various services, including to receive a set of spend transaction records containing one or more spend attributes by capturing, managing and monitoring IT spend data with respect to various IT services, sourcing initiatives or sourcing programs;
        provide a spend visibility analysis between an estimated budget data and the spend data; and
        generate a spend visibility management report related to the spend visibility analysis;
        generate analysis, variance and spend compliance reports related to each IT sourcing initiatives or sourcing programs for each vendor;
        facilitate a feedback loop mechanism for carrying out root cause analysis for the non compliance spend, issues, risks and disputes and providing a corrective action plan for continual improvements;
        trigger opportunities for a spend compliance and cost savings initiative to move towards an optimal vendor category management;
        provide an insight on supplier spend, spend analysis provides significantly higher visibility into key suppliers, supply sources, maverick spend, contractual and spend compliance by IT spend visibility management and reporting module; and
        apply an invoice-purchase order systemization operational process algorithm, comprising: a) extracting and uploading purchase order data to the sourcing management governor, b) performing purchase order reconciliation, c) establishing a relationship between each purchase order and a region and/or country, d) extracting and uploading invoice data to the sourcing management governor, e) establishing relationships between each uploaded invoice and a region and/or country, f) reconciling the invoices to the purchase orders and posting the invoices to an invoice master, g) establishing a relationship between the invoices and spend management Key Performance Indicators, and h) performing spend visibility analysis and generating reports;

a value management and reporting module executed by a computer configured to:
        establish and prioritize a plurality of sourcing objectives;
        identify a plurality of key value drivers with respect to the plurality of sourcing objectives;
        establish financial and non-financial key performance indicators;
        govern the plurality of key value drivers and perform a value driver analysis;
        generate a value management report with a feedback loop; and
        apply a value management systemization operational process algorithm, comprising: a) creating a value management review plan and linking the value management review plan to the IT service tower project, b) assigning a customer region and country and mapping contract documents to the value management review plan, c) executing the value management review plan and capturing appropriate value drivers, d) carrying out value driver analysis and generating variance reports, e) performing a review of value management reporting action plan and review closure, and f) performing a feedback loop continual improvements and action plan;

a vendor contract compliance management module executed by a computer configured to ensure vendor contract compliance through contract compliance audits by monitoring the compliance, risk and vendor governance;

a contract evaluation analysis module executed by a computer configured to:
        manage customer, vendor and regulatory, sourcing management and governance aspects;
        provide a contract evaluation analysis of the customer, vendor and regulatory, sourcing management and governance aspects; and
        generate a contract evaluation report with a feedback loop;

a performance management module executed by a computer configured to evaluate vendor performance cut across a plurality of key stakeholders;

a service delivery management module executed by a computer configured to manage a plurality of service delivery functions to meet support requirements of the customer; and a sourcing governance management module executed by a computer configured to enable governance of a plurality of key process areas (KPA) among the plurality of key stakeholders utilizing management dashboards and scorecards;

whereby the sourcing management governor enhances and optimizes relationship between the customer organization and the vendor organization utilizing the contract compliance management module, the financial management module, the relationship management module, the vendor management module, the contract evaluation analysis module, the performance management module, the sourcing governance management module, the service delivery management module regardless of the scope objectives, contract, IT sourcing program, vendor, service delivery location and region, country and business units throughout the sourcing lifecycle.

24. The non-transitory computer-readable medium of claim 23 wherein the spend visibility management report includes value leakages, cost savings and appropriate risk and effective control measures to govern the spend data.

25. The non-transitory computer-readable medium of claim 23 wherein the relationship management module is configured to enhance service quality improvements of services delivered by the vendor organization and financial performance measures utilizing the value driver analysis.

26. The non-transitory computer-readable medium of claim 23 wherein the financial performance measures include customer satisfaction management, monthly spend and cost reduction in vendor cost.

27. The non-transitory computer-readable medium of claim 23 wherein the evaluation of vendor performance is performed by executing customer satisfaction survey with respect to sourcing and governance aspects for underlying sourcing initiatives and associated vendor organizations.

28. The non-transitory computer-readable medium of claim 23 wherein the sourcing management governor provides strategic insights about contract terms, financial performance, commercial management, service delivery, contractual obligations, compliance, cost, risk and the relationship with the external or extended partners.

29. The non-transitory computer-readable medium of claim 23 wherein the sourcing lifecycle comprises a plurality of phases including a managing phase, a monitoring phase, a tracking phase, a reporting phase and a feedback phase.

* * * * *